US012159366B2

(12) United States Patent
Prins et al.

(10) Patent No.: US 12,159,366 B2
(45) Date of Patent: Dec. 3, 2024

(54) HIGH RESOLUTION REAL-TIME ARTISTIC STYLE TRANSFER PIPELINE

(71) Applicant: GOOGLE LLC, Mountain View, CA (US)

(72) Inventors: Adam Prins, Kitchener (CA); Erin Hoffman-John, Palo Alto, CA (US); Ryan Poplin, Newark, CA (US); Richard Wu, Mountain View, CA (US); Andeep Toor, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 491 days.

(21) Appl. No.: 17/436,298

(22) PCT Filed: Mar. 12, 2020

(86) PCT No.: PCT/US2020/022302
§ 371 (c)(1),
(2) Date: Sep. 3, 2021

(87) PCT Pub. No.: WO2020/190624
PCT Pub. Date: Sep. 24, 2020

(65) Prior Publication Data
US 2022/0172322 A1 Jun. 2, 2022

Related U.S. Application Data

(60) Provisional application No. 62/947,262, filed on Dec. 12, 2019, provisional application No. 62/819,717, filed on Mar. 18, 2019.

(51) Int. Cl.
*G06T 3/40* (2024.01)
*G06T 5/00* (2006.01)
*G06T 5/50* (2006.01)

(52) U.S. Cl.
CPC .............. *G06T 3/40* (2013.01); *G06T 5/00* (2013.01); *G06T 5/50* (2013.01); *G06T 2207/20024* (2013.01)

(58) Field of Classification Search
None
See application file for complete search history.

(56) References Cited

U.S. PATENT DOCUMENTS 10,210,631 B1   2/2019   Cinnamon et al.
10,339,443 B1 * 7/2019   Medioni ............... G06T 7/40
(Continued)

FOREIGN PATENT DOCUMENTS

CN   110415306 A   11/2019
JP   2018132855 A   8/2018

OTHER PUBLICATIONS

Pandey et al ("Computationally Efficient Approaches for Image Style Transfer", Published in: 2018 15th IEEE India Council International Conference (INDICON), Date of Conference: Dec. 16-18, 2018, DOI: 10.1109/INDICON45594.2018.8987053, pp. 1-6, retrieved from the Internet of Oct. 27, 2023) (Year: 2018).*

(Continued)

*Primary Examiner* — Leon Viet Q Nguyen

(57) ABSTRACT

Systems and methods are provided for receiving at least one image and a reference image, and performing a plurality of downscaling operations having separable convolutions on the received at least one image. A plurality of residual blocks may be formed, with each residual block containing two separable convolutions of the kernel and two instance normalizations. A plurality of upscaling operations may be performed on the plurality of residual blocks, and a stylized image may be displayed based on at least the performed plurality of upscaling operations and the reference image.

23 Claims, 24 Drawing Sheets

(56) References Cited

U.S. PATENT DOCUMENTS

| | | |
|---|---|---|
| 2018/0075581 A1* | 3/2018 | Shi .................... G06N 3/045 |
| 2018/0137406 A1 | 5/2018 | Howard et al. |
| 2018/0174348 A1 | 6/2018 | Bhat et al. |
| 2019/0057519 A1 | 2/2019 | Cinnamon et al. |
| 2019/0138838 A1 | 5/2019 | Liu et al. |
| 2019/0139191 A1* | 5/2019 | Liu .................... G06N 3/045 |
| 2019/0333199 A1* | 10/2019 | Ozcan ............... G06T 3/4046 |
| 2020/0051291 A1 | 2/2020 | Cinnamon et al. |
| 2020/0092529 A1 | 3/2020 | Yoshida |

OTHER PUBLICATIONS

Internal Search Report and Written Opinion for mailed Feb. 25, 2021 for corresponding International Application No. PCT/US2020/036059, 14 pages.

Li et al., "3D Model Generation and Reconstruction Using Conditional Generative Adversarial Network", https://doi.org/10.2991/ijcis.d.190617.001, International Journal of Computational Intelligence Systemsvol. 12(2), 2019, 9 pages.

Jin et al., "Towards the Automatic Anime Characters Creation with Generative Adversarial Networks", https://arxiv.org/abs/1708.05509, Comiket 92 (Summer 2017), Tokyo Big Sight, 16 pages.

GitHub-NVlabs/SPADE: Semantic Image Synthesis with SPADE search results, https://github.com/NVlabs/SPADE, Mar. 31, 2020, 5 pages.

"How can machine learning be applied to game development?", https://www.gamesindustry.biz/articles/2020-03-16-how-can-machine-learning-be-applied-to-game-development, Brendan Sinclair, Mar. 16, 2020, 9 pages.

Goodfellow et al. "Generative Adversarial Nets", https://arxiv.org/abs/1406.2661, Département d'informatique et de recherche opérationnelle, Université de Montréal, Jun. 10, 2014. 9 pages.

Johnson et al. "Perceptual Losses for Real-Time Style Transfer and Super-Resolution", https://arxiv.org/abs/1603.08155, Department of Computer Science, Stanford University, Mar. 27, 2016, 18 pages.

Ma et al., "Background Augmentation Generative Adversarial Networks (BAGANs): Effective Data Generation Based on GAN-Augmented 3D Synthesizing", www.mdpi.com/journal/symmetry, Symmetry 2018, 10, 734; doi:10.3390/sym10120734.

Bertsch, "Multistyle Pastiche Generator", Magenta, https://magenta.tensorflow.org/2016/11/01/multistyle-pastiche-generator, Nov. 1, 2016, 8 pages.

Gatys et al., "A Neural Algorithm of Artistic Style", https://arxiv.org/abs/1508.06576, Sep. 2, 2015, 16 pages.

Huang et al., "Real-Time Neural Style Transfer for Videos" 2017 IEEE Conference on Computer Vision and Pattern Recognition (CVPR), 9 pages.

Jing et al., "Neural Style Transfer: A Review", https://arxiv.org/abs/1705.04058v7, May 11, 2017, 14 pages.

Johnson et al, "Perceptual Losses for Real-Time Style Transfer and Super-Resolution", https://arxiv.org/abs/1603.08155, Mar. 27, 2016, 18 pages.

Pandey et al., "Computationally Efficient Approaches for Image Style Transfer", https://arxiv.org/abs/1807.05927, Jul. 16, 2018, 6 pages.

Rainy, et al., "Stabilizing Neural Style-Transfer for Video", https://medium.com/element-ai-research-lab/stabilizing-neural-style-transfer-for-video-62675e203e42, Feb. 12, 2018, 8 pages.

Ruder et al. "Artistic Style Transfer for Videos", https://arxiv.org/abs/1708.04538, Apr. 28, 2016, 14 pages.

Ulyanov et al. "Instance Normalization: The Missing Ingredient for Fast Stylization", https://arxiv.org/abs/1607.08022, Jul. 27, 2016, 6 pages.

International Search Report and Written Opinion mailed Jun. 29, 2020 for PCT/US2020/022302, 16 pages.

International Preliminary Report on Patentability mailed Sep. 30, 2021 for PCT/US2020/022302, 11 pages.

International Patent Application PCT/US2020/36059, filed Jun. 4, 2020, listing Erin Hoffman-John et al. as inventors, entitled "Visual Asset Development Using a Generative Adversarial Network".

International Preliminary Report on Patentability mailed Dec. 15, 2022 for PCT/US2020/036059, 8 pages.

Translation of Japanese Office Action mailed Jan. 24, 2023 for JP Application No. 2021-556587, 6 pages.

Ngxande, Mkhuseli et al.,"DepthwiseGANs: Fast Training Generative Adversarial Networks for Realistic Image Synthesis", 2019 Southern African Universities Power Engineering Conference/Robotics and Mechatronics/Pattern Recognition Association of South Africa (SAUPEC/RobMech/PRASA), Jan. 30, 2019, pp. 111-116.

Translation of Japanese Office Action mailed Sep. 19, 2023 for JP Application No. 2021-556587, 6 pages.

Communication pursuant to Article 94(3) EPC mailed Nov. 7, 2023 for EP Application No. 20716356.9, 6 pages.

Translation of Notice of Grounds of Rejection mailed Dec. 26, 2023 for JP Application No. 2022-574632, 5 pages.

Translation of Decision for Rejection mailed Jun. 25, 2024 for JP Application No. 2022-574632, 5 pages.

Non-Final Office Action mailed Aug. 15, 2024 for U.S. Appl. No. 17/928,874, 50 pages.

Ziegler, Remo et al., "3D Reconstruction Using Labeled Image Regions", Eurographics Symposium on Geometry Processing, 2003, 12 pages.

Translation of Chinese Office Action mailed Aug. 16, 2024 for CN Application No. 202080101630.1, 19 pages.

\* cited by examiner

HIGH RESOLUTION REAL-TIME ARTISTIC STYLE TRANSFER PIPELINE

CROSS-REFERENCE TO RELATED APPLICATIONS

The present application is a U.S. National Stage under 35 U.S.C. § 371 of International Patent Application Serial No. PCT/US2020/022302, entitled "HIGH RESOLUTION REAL-TIME ARTISTIC STYLE TRANSFER PIPELINE" and filed on 12 Mar. 2020, which claims priority to U.S. Provisional Application No. 62/819,717, entitled "HIGH RESOLUTION REAL-TIME ARTISTIC STYLE TRANSFER PIPELINE" and filed on 18 Mar. 2019, and U.S. Provisional Application No. 62/947,262, entitled "HIGH RESOLUTION REAL-TIME ARTISTIC STYLE TRANSFER PIPELINE" and filed on 12 Dec. 2019, the entireties of which are incorporated by reference herein.

BACKGROUND

Style transfer is a process of combining content of one image and a style of another image to create a new image. Some current style transfer systems may create a stylized still image based on an input image and a reference style image. However, when such systems are used frame-by-frame on animations or full-motion video, the results are typically not aesthetically pleasing, and take a long time to generate. That is, features such as colors, textures, and brush strokes that appear in one frame might vanish in the next, resulting in an unpleasantly flickering video. Current systems and techniques cannot perform style transfer at rates so as to be used in video games, or for real-time style transfer of full-motion video at high resolution.

BRIEF SUMMARY

According to an implementation of the disclosed subject matter, a method may be provided that includes receiving, at a computing device, at least one image and a reference image. The method may include performing, at the computing device, a plurality of downscaling operations having separable convolutions on the received at least one image, including performing a first separable convolution with a kernel to convert a first set of channels to a second set of channels, where the number of the second set of channels is greater than the first set of channels, and performing a second separable convolution with the kernel to convert the second set of channels of the first separable convolution to a third set of channels, where the number of the third set of channels is greater than the second set of channels. The method may include forming, at the computing device, a plurality of residual blocks, with each residual block containing two separable convolutions of the kernel and two instance normalizations. The method may include performing, at the computing device, a plurality of upscaling operations on the plurality of residual blocks, including performing a first upscaling operation by performing a third separable convolution on the third set of channels to convert them to the second set of channels, and performing a second upscaling operation by performing a fourth separable convolution on the second set of channels to convert them to the first set of channels. The method may include displaying, at a display device communicatively coupled to the computing device, a stylized image based on at least the performed plurality of upscaling operations and the reference image.

According to an implementation of the disclosed subject matter, a system may be provided that includes a computing device having at least a processor and a memory to receive at least one image and a reference image, and perform a plurality of downscaling operations having separable convolutions on the received at least one image. The downscaling operations performed by the computing device may include performing a first separable convolution with a kernel to convert a first set of channels to a second set of channels, where the number of the second set of channels is greater than the first set of channels, and performing a second separable convolution with the kernel to convert the second set of channels of the first separable convolution to a third set of channels, where the number of the third set of channels is greater than the second set of channels. The computing device may form a plurality of residual blocks, with each residual block containing two separable convolutions of the kernel and two instance normalizations. The computing device may perform a plurality of upscaling operations on the plurality of residual blocks. The upscaling operations performed by the computing device may include performing a first upscaling operation by performing a third separable convolution on the third set of channels to convert them to the second set of channels, and performing a second upscaling operation by performing a fourth separable convolution on the second set of channels to convert them to the first set of channels. The system may include a display device, communicatively coupled to the computing device, to display a stylized image based on at least the performed plurality of upscaling operations and the reference image.

According to an implementation of the disclosed subject matter, means for stylizing an image may be provided that includes receiving at least one image and a reference image. The means may perform a plurality of downscaling operations having separable convolutions on the received at least one image, including performing a first separable convolution with a kernel to convert a first set of channels to a second set of channels, where the number of the second set of channels is greater than the first set of channels, and performing a second separable convolution with the kernel to convert the second set of channels of the first separable convolution to a third set of channels, where the number of the third set of channels is greater than the second set of channels. The means may form a plurality of residual blocks, with each residual block containing two separable convolutions of the kernel and two instance normalizations. The means may perform a plurality of upscaling operations on the plurality of residual blocks, including performing a first upscaling operation by performing a third separable convolution on the third set of channels to convert them to the second set of channels, and may perform a second upscaling operation by performing a fourth separable convolution on the second set of channels to convert them to the first set of channels. The means may display a stylized image based on at least the performed plurality of upscaling operations and the reference image.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1A:
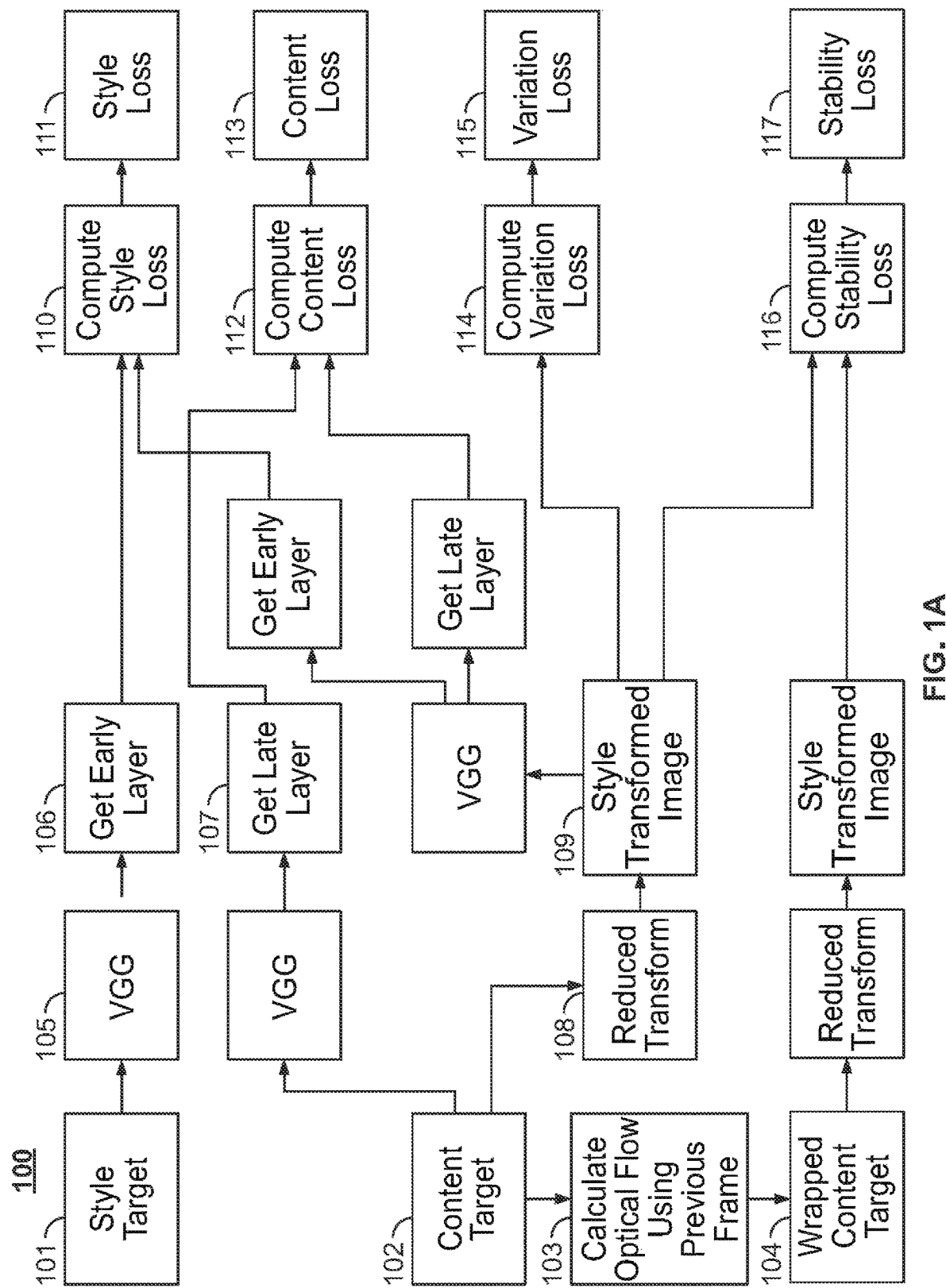
FIG. 1A shows a style transfer model according to an implementation of the disclosed subject matter.

Implementations of the disclosed subject matter provide real-time (e.g., 100 ms or less rendering time, 45-60 frames per second video, or more) style conversion of video with high image resolution. For example, the disclosed subject matter may provide style transfer of video images, where each frame of the video may have a resolution with 1,920 pixels displayed across a display screen horizontally and 1,080 pixels down a display screen vertically, where the image is progressively scanned (i.e., non-interlaced 1080p resolution). Implementations of the disclosed subject matter may provide style for video and/or video games, where each video frame may be produced procedurally with input from a game player. Some implementations of the disclosed subject matter may provide style transfer of video images and/or video game images to be displayed as 3D (three dimensional) images. The implementations of the disclosed subject matter improve upon existing style transfer systems, which require long processing times in minutes or hours, and typically produce low-resolution images.

Implementations of the disclosed subject matter may provide style transfer using a plurality of downscaling operations, which may have separable convolutions. The style transfer of the disclosed subject matter may form residual blocks based on the downscaling operations, with each of the residual blocks including two separable convolutions and two instance normalizations. The style transfer of the disclosed subject matter may include upscaling operations, which may have separable convolutions.

Some current systems provide artistic style transfer that use a deep neural network to create an aesthetically appealing artistic effect by combining two images. Other current systems provide a multi-layered system that produces configurable blends of artistic styles on an image. However, unlike the implementations of the disclosed subject matter, these neural networks and multi-layered systems provide style transfer, but are not capable of generating an image rapidly for animation purposes in an interactive real-time environment, such as in a video game.

Other current systems provide noise reduction in creating moving images with neural networks. In such systems, each frame is not aware of the frames surrounding it, and the system generates subtle variations that reach the viewer as noise. Unlike the implementations of the disclosed subject matter, such current systems do not provide for real-time style conversion.

Implementations of the disclosed subject matter may reduce the complexity of traditional layering systems to increase runtime style transfer of images by reducing the kernel size and reducing the number of downscaling and upscaling operations, and by increasing the number of residual blocks used in separable convolution.

The style transfer system of the disclosed subject matter that may include a convolutional neural network that may be trained on video and/or video game footage of a game environment. The video and/or the video game footage may be the source footage. This training may allow the style transfer system to recognize objects in a video and/or a video game environment.

FIG. 1A shows a style transform model 100, which may be implemented on style transfer system (e.g., computing device 620 shown in FIG. 6, and/or device 10, remote service 11, user interface 13, and/or processing unit 14 shown in FIG. 7) and may be used in connection with method 200 shown in FIGS. 2A-2C and described below. A style target may be a reference image (101) having an artistic style to be transferred (see, e.g., image 310 shown in FIG. 3B). A content target may be an input image (102) (see, e.g., image 300, shown in FIG. 3A) that may be transformed in style based on the reference image (101). The outputs of various intermediate layers of the model 100, and the may be used to compute at least two type of losses: style loss (111) and content loss (113). These losses may relate to how close a resultant stylized image is to the reference image (in terms of style), and how close the stylized image is to the input image in content. In some implementations described below, variation loss (115) and/or stability loss (117) may be determined by the model 100. The intermediate layers of the model 100 may be the layers and/or operations between the reference image (101) and/or the input image (102), and the style loss (111), content loss (113), variation loss (115), and/or stability loss (117).

A reduced transform (108) of the style transfer system may be used to compute the content loss (i.e., compute the content loss at 112, and output the content loss at 113), as described below in connection with FIG. 1B and FIGS. 2A-2C. To compute the content loss (112, 113), the style transfer system may use the input image (102) and the stylized image (109), square the difference between each corresponding value in at least one layer of the images (e.g., early layer 106 and/or late layer 107), and sum them all up for each of the layers. In some implementations, each of the representations may be multiplied by a value alpha (i.e., the content weight) before finding their differences and squaring it. In some implementations, each of the values may be multiplied by the content weight (alpha value) after squaring the differences. The computed content loss may be output (i.e. content loss 113).

The style transfer system may compute the style loss at (110) and output the style loss at (111). Instead of comparing raw outputs of the reference image (101) and the stylized image (109) at various layers, a Gram matrices of the outputs may be compared. A Gram matrix may result from multiplying a matrix with the transpose of itself. The style transfer system may determine a Euclidean distance between the Gram matrices of the intermediate representations of the stylized image (109) and reference image (102) to find how similar they are in style. The Euclidean distances between each corresponding pair of values in the Gram matrices computed at each layer for one or more layers (e.g., early layer 106 and/or late layer 107) may be determined, and these values may be multiplied by a value beta (i.e., the style weight). The computed style loss may be output (i.e. style loss 111).

In computing the style loss (111) and/or the content loss (113), a Visual Geometry Group (VGG) convolutional neural network (e.g., VGG 105) may be use, and/or any other suitable convolutional neural network. The VGG may be used to determine a balance between image content (e.g., input image (102)) and style (e.g., from the reference image (101)), and/or the scale of the features transferred. The VGG and the computation the style loss (111) and/or the content loss (113) may be further described in connection with FIG. 4A below.

In some implementations, the style transfer system may determine a variation loss (115) and/or a stability loss (117). Variation loss (115) may be used to reduce the amount of noise image in a stylized image. That is, the variation loss may be computed (114) by making the values of neighboring pixels as similar as possible. The stability loss (117) may be calculated (116) by determining a pixel-wise difference between one or more pixels of the input image and the pixels of the previous frame, and squaring the difference. The style transfer system may be trained in order to minimize the stability loss (117). In determining the stability loss (117), the style transfer system may calculate an optical flow (103) by determining a variance between the input image (102) and a previous frame (e.g., when the input image is from a video and/or a video game, and the previous frame is the frame that precedes the input image in the video and/or video game). The style transfer system may predict and/or estimate the motion between one or more portions of the input images. The optical flow (103) may be calculated by a pre-trained neural network that uses the input image (102) and the previous frame to estimate the optical flow (103) of the pixels. In calculating optical flow, the neural network may find correspondences between the input image and the previous frame. The neural network may determine image feature representations, and matching them at different locations in the input image and the previous frame. In some implementations, the style transfer system may ignore occluded pixels when comparing the previous frame and the input image (102) in calculating the optical flow (103).

The style transfer system may determine a warped content loss (104) when determining the stability loss (117). The warped content loss (104) may determine the loss of content from the input image (102) based on image distortion and/or blur based on the difference between the previous frame and the input image (102). The style transfer system may use the reduced transform described below in connection with FIGS. 1B and 2A-2C in computing the stability loss (116).

Figure 1B:
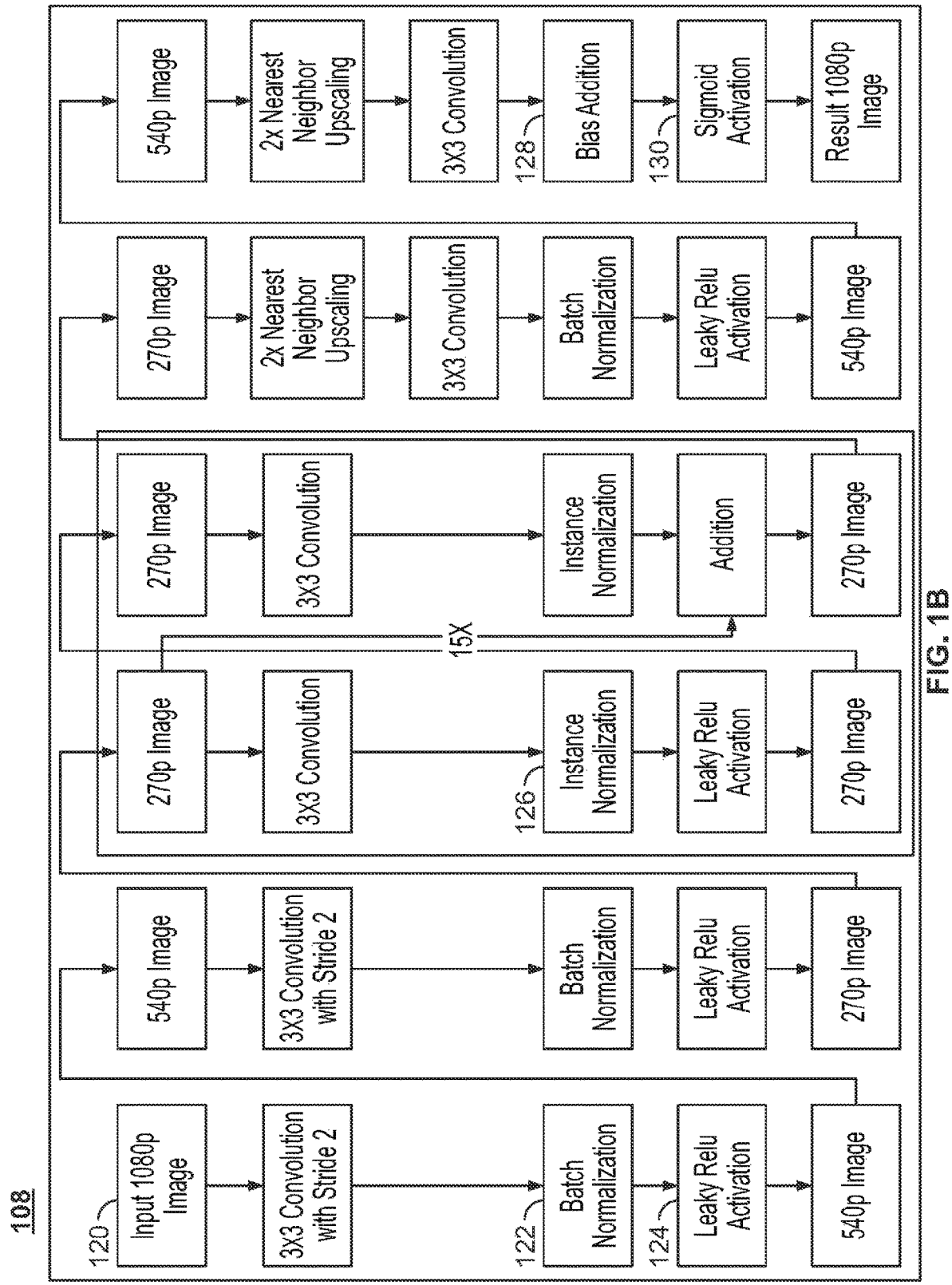
FIG. 1B shows a reduced transform model of the style transform model shown in FIG. 1A according to an implementation of the disclosed subject matter.

FIG. 1B shows a detailed version of the reduced transform model 108 used as part of the style transform model 100 shown in FIG. 1A and/or the method 200 described in connection with FIGS. 2A-2C. The input image 1080p, input image 540p, input image 270p, or the like may be image resolutions for the input image (120). The convolution operations shown in FIG. 1B may be described above in connection with FIG. 2A-2C. The batch normalizations 122 shown in FIG. 1B may be used to normalize the input image by adjusting and/or scaling an activation function. The Leaky ReLU (Rectified Linear Unit) activation 124 may be used to provide a predefined small, positive gradient when the unit is not active. Where batch normalization 122 may normalize all images across a batch and spatial locations, instance normalization 126 may normalizes each batch independently, i.e., across spatial locations. Bias addition 128 may be an additional set of weights to be added. Sigmoid activation 130 may be a function having a characteristic "S"-shaped curve, and may have a particular range as an output.

Figure 2A:
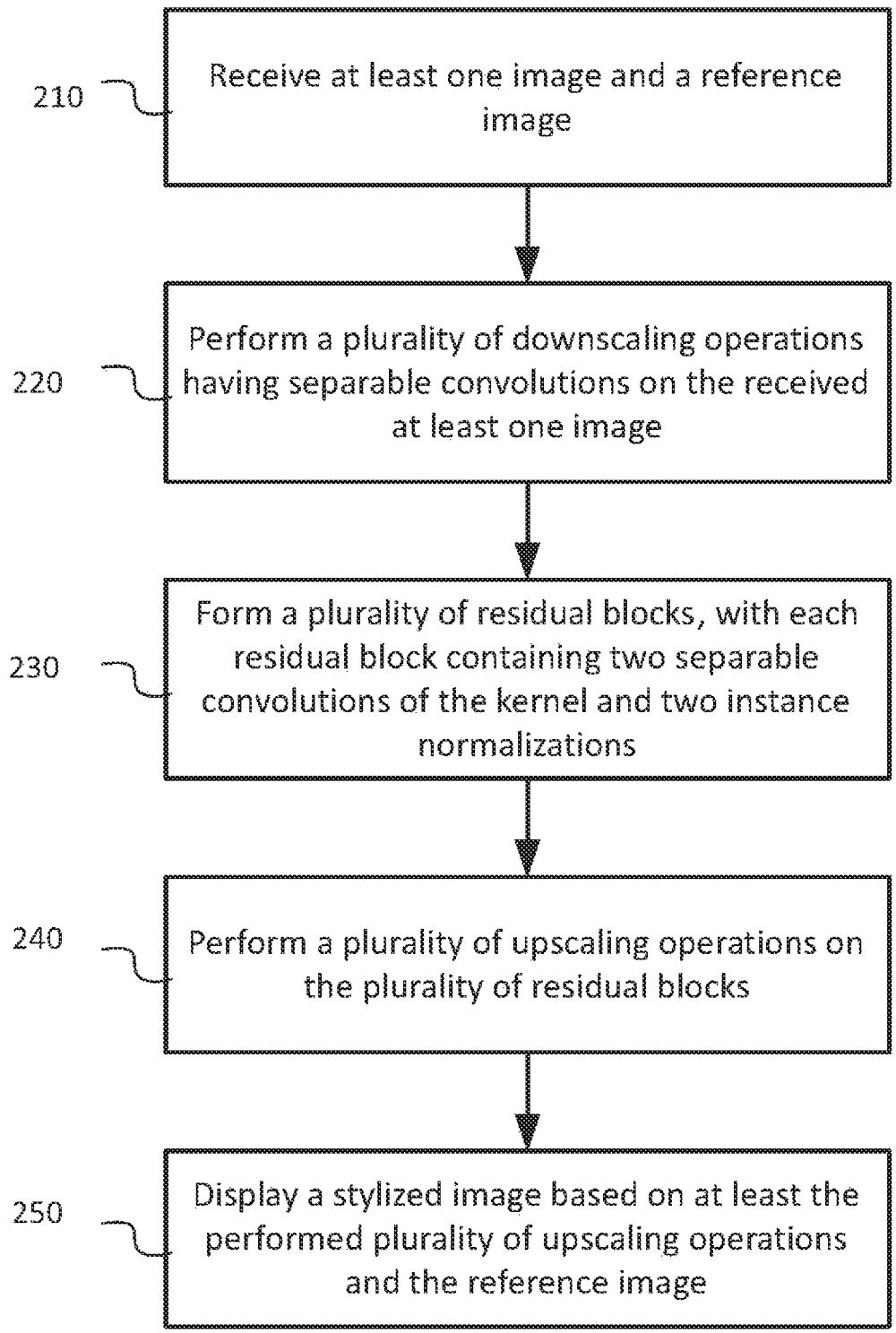
FIG. 2A-2C show an example method of stylizing an image from a source video based on a reference image according to an implementation of the disclosed subject matter.
Figure 2B:
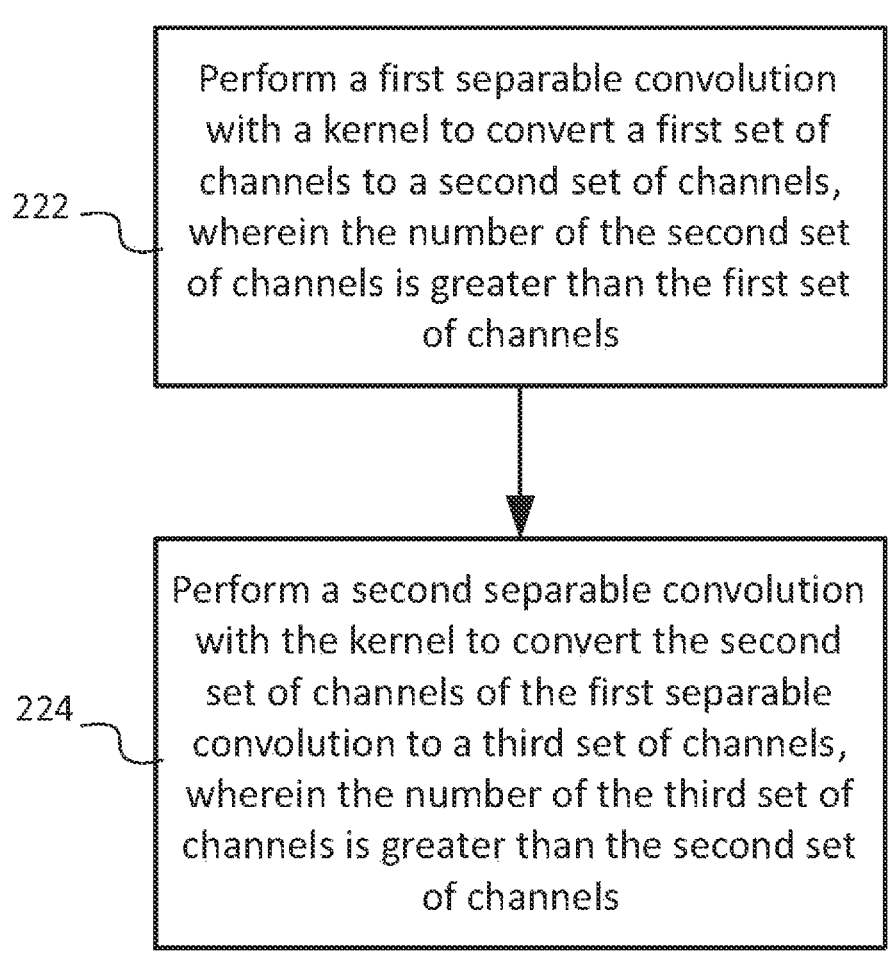
Figure 2C:
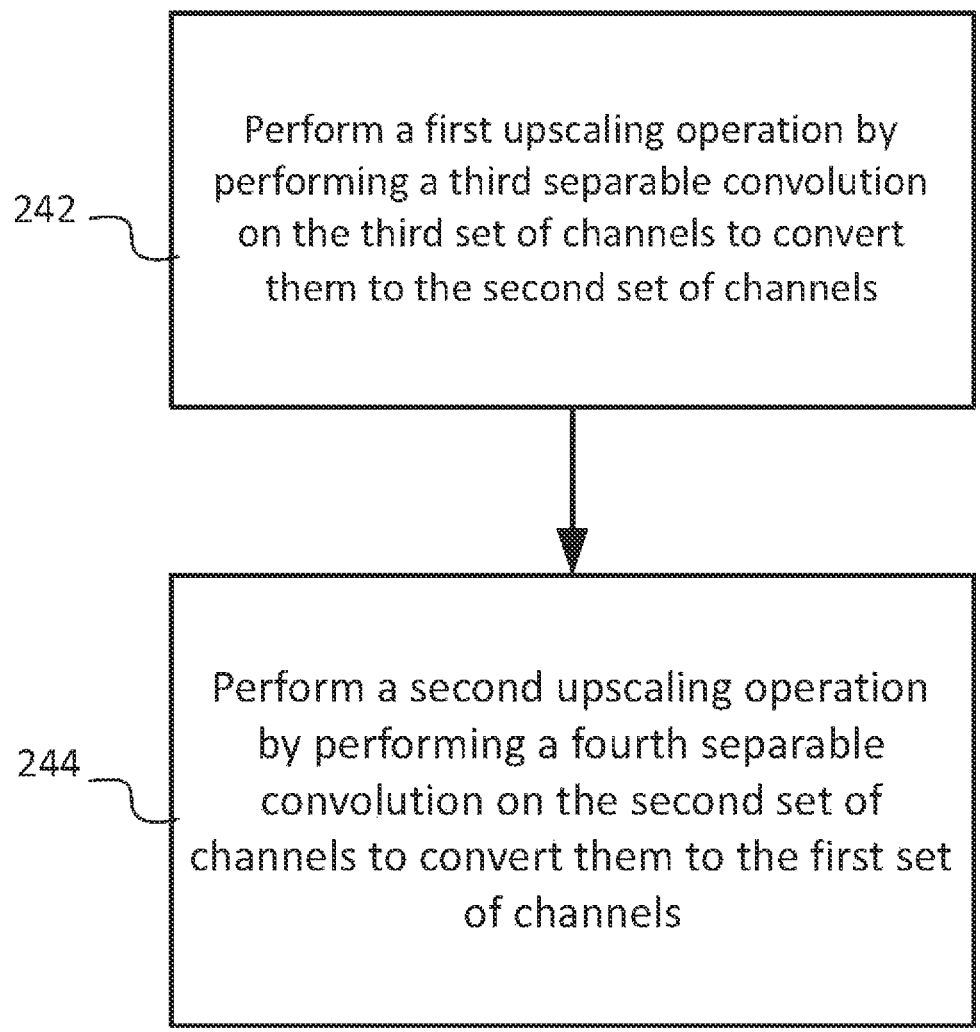

FIGS. 2A-2C show an example method 100 of stylizing an image from a source video based on a reference image according to an implementation of the disclosed subject matter. In some implementations, the reduced transform model 108 (shown in FIGS. 1A-1B) may perform the method 100. At operation 100, a computing device may receive at least one image and a reference image. The computing device may be computing device 20 shown in FIG. 6, and/or device 10, remote service 11, user interface 13, and/or processing unit 14 shown in FIG. 7 and described below. The at least one image may be an image and/or frame from a video and/or a video game.

Figure 3A:
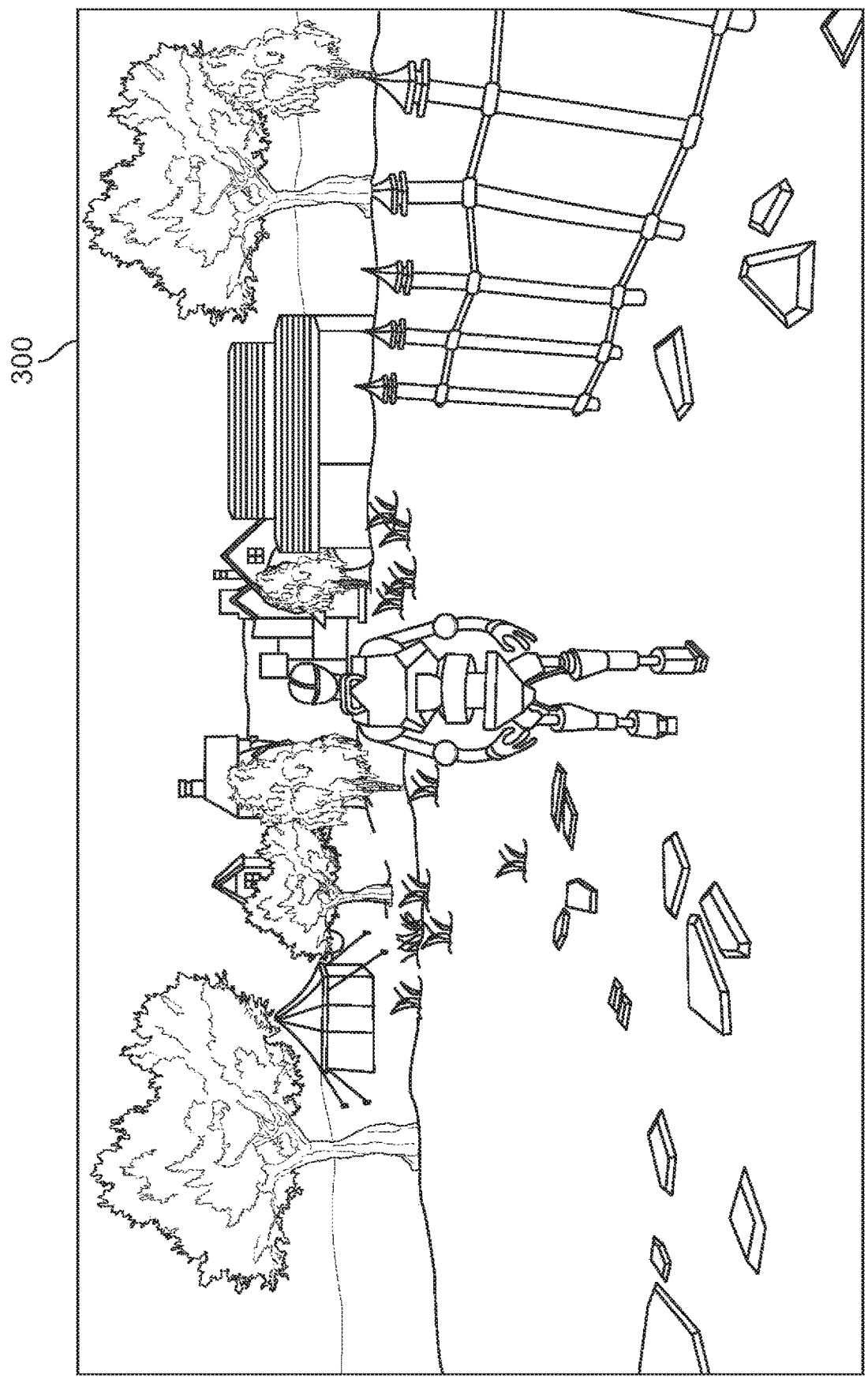
FIG. 3A shows an image from source video to perform style transfer on according to an implementation of the disclosed subject matter.
Figure 3B:
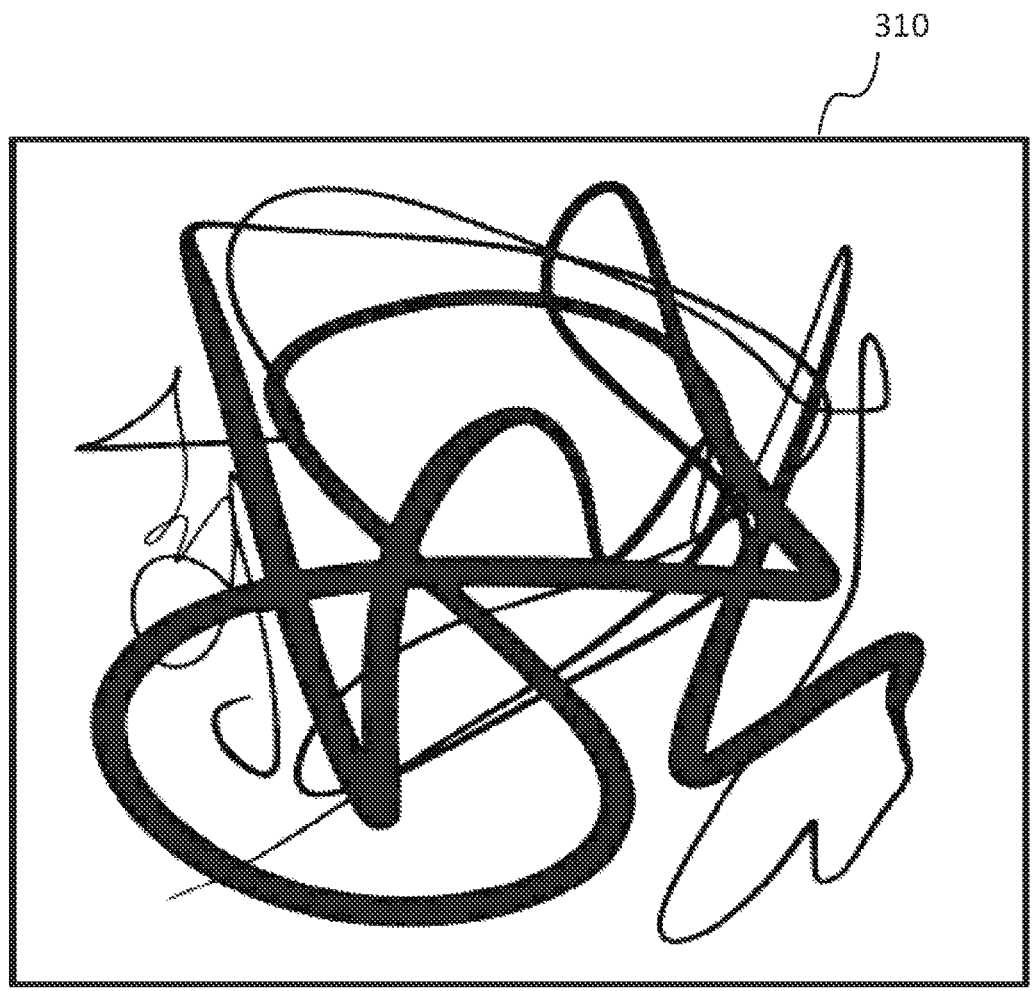
FIG. 3B shows a reference image used to perform style transfer on the source video footage of FIG. 3A according to an implementation of the disclosed subject matter.
Figure 3C:
FIG. 3C shows a style transferred resultant image of the source video footage of FIG. 3A based on the reference image of FIG. 3B according to an implementation of the disclosed subject matter.

In implementations of the disclosed subject matter, the reference image (i.e., a still image) may be provided to the style transfer system (e.g., computing device 620 shown in FIG. 6, and/or device 10, remote service 11, user interface 13, and/or processing unit 14 shown in FIG. 7) that has been trained using video. The reference image may be a painting, a photograph, a pencil sketch, or the like. For example, FIG. 3A shows an image 300 from source video footage (i.e., the received at least one image), and FIG. 3B shows a reference image 310 used to perform style transfer on the source video footage of FIG. 3A, including image 300, according to an implementation of the disclosed subject matter. As described throughout, the image 320 shown in FIG. 3C may result from performing the operations on image 300 described with respect to FIGS. 2A-2C by using the image 310 of FIG. 3B as the reference image.

At operation 220, the computing device may perform a plurality of downscaling operations having separable convolutions on the received at least one image. Example individual downscaling operations of operation 220 are shown in FIG. 2B and in FIG. 1B (e.g., downscaling of 1080p image to 540p, downscaling of 540p image to 270p image, and the like). At operation 222, the computing device may perform a first separable convolution with a kernel to convert a first set of channels to a second set of channels. The number of the second set of channels may be greater than the first set of channels. In some implementations, the computing device may convert the first set of channels having 3 channels to the second set of channels having 32 channels.

At operation 224, the computing device may perform a second separable convolution with the kernel to convert the second set channels of the first separable convolution to a third set of channels. The number of the third set of channels may be greater than the second set of channels. In some implementations, the second set of channels may have 32 channels that may be converted to the third set of channels having 64 channels.

In some implementations, the computing device may apply a filter to input values of the received at least one image, where the filter is based on a vector of weights and a bias before performing the first separable convolution at operation 222. That is, the filter may be applied by the computing device before performing the plurality of downscaling operations 220.

In an example, the style transfer system of the disclosed subject matter may combine the received at least one image (e.g., source footage that may include one or more frames of video or game video, as shown in image 300 of FIG. 3A) and an artistic style of the reference image (e.g., as shown in image 310 of FIG. 3B) using the following operations shown in FIGS. 2A-2C and described above.

In the example, two downscaling operations may be performed by the convolutional neural network (e.g., computing device 20 shown in FIG. 6, and/or device 10, remote service 11, processing unit 14, and/or database 15 shown in FIG. 7) provide downscaling of the at least one receive image (i.e., the input images). Convolutional layers of the network may apply a convolution operation to the input (e.g., at operation 222), and may pass the result to the next layer. The convolution (e.g., the plurality of downscaling operations having separable convolutions on the received at least one image at operation 220) may emulate the response of an individual neuron to visual stimuli.

Each neuron in a neural network may compute an output value by applying a filter to the input values coming from the receptive field in the previous layer. A neuron may be an elementary unit in a neural network. The neuron may receive one or more inputs, and may sum them to produce an output. Each input may be separately weighted, and the sum may be passed through a function (i.e., a filter).

As described above, the filter that is applied to the input values may be specified by a vector of weights and a bias. Learning and/or training in a convolutional neural network may be performed by making incremental adjustments to the biases and weights. The vector of weights and the bias of the filter may represent one or more features of the input. The convolutional neural network may have a plurality of neurons share the same filter. This may reduce memory used (e.g., the memory 27 used by computing device 20 shown in FIG. 6, and/or memory used by device 10, remote service 11, processing unit 14, and/or database 15 shown in FIG. 7), as a single bias and a single vector of weights may be used across fields sharing that filter, rather than each field having its own bias and vector of weights.

In this example, the two downscaling operations (e.g., as shown in FIG. 2B as operations 222 and 224) may include separable convolutions for a 3×3 kernel (i.e., a 3×3 input volume), having a stride of 2. The stride may be the amount that the kernel is shifted. That is, a stride value may control how a filter convolves around an input volume (e.g., 3×3 input volume, or kernel). The plurality of operations 22 may begin with three channels (e.g., red, green, and blue channels), and may increase the number of channels over the two downscaling operations 222, 224 to 32 channels (i.e., depth 32, where the number of channels changes from 3 to 32) and 64 channels (i.e., depth 64, where the number of channels changes from 32 to 64). That is, in operation 222, a separable convolution with a 3×3 kernel may convert 3 channels to 32 channels, with a stride of 2. In operation 224, a separable convolution with a 3×3 kernel may convert 32 channels to 64 channels, with a stride of 2.

At operation 230 shown in FIG. 2A, the computing device may form a plurality of residual blocks, with each residual block containing two separable convolutions of the kernel and two instance normalizations. In traditional neural networks, each layer feeds into the next layer. In a network with residual blocks, such as in implementations of the disclosed subject matter, each layer may feed into the next layer, as well as directly into the layers about 2-3 hops away. In some implementations, the formed residual blocks may include 15 residual blocks. Each of the 15 residual blocks may have two separable convolutions of a 3×3 kernel, and two instance normalizations. That is, 15 residual blocks may be formed after the two downscaling operations (as shown in operations 222, 224 of FIG. 2B), with each residual block containing two separable convolutions of a 3×3 kernel and two instance normalizations. In traditional neural networks, each layer feeds into the next layer. In a network with residual blocks, such as in implementations of the disclosed subject matter, each layer may feed into the next layer and directly into the layers 2 hops away (i.e., residual connections every 2). There may be 64 channels, and the stride may be 1 for this 3×3 kernel. That is, there may be 30 separable convolutions with the 3×3 kernel (i.e., 2 instances with 15 blocks each, for 30 total separable convolutions), with 64 channels, stride 1, with two instance normalization (i.e., residual connections every 2).

At operation 240 shown in FIG. 2A, the computing device may perform a plurality of upscaling operations on the plurality of residual blocks. As shown in FIG. 2C, the computing device may perform a first upscaling operation by performing a third separable convolution on the third set of channels to convert them to the second set of channels at operation 242. The computing device may perform a second upscaling operation by performing a fourth separable convolution on the second set of channels to convert them to the first set of channels at operation 244.

For example, after the formation of the residual blocks (e.g., at operation 230 shown in FIG. 2A), two upscaling operations may be performed (e.g., as shown in operations 242, 244 in FIG. 2C). In some implementations, the first upscaling operation (e.g., operation 242 of FIG. 2C) may transpose separable convolutions with a 3×3 kernel, and the 64 channels may be converted to 32 channels, with stride 2. The second upscaling operation (e.g., operation 244 of FIG. 2C) may transpose separable convolutions with a 3×3 kernel, and the 32 channels may be converted to 3 channels, with stride 2. The first upscaling operation (e.g., operation 242) and the second upscaling operation (e.g., operation 244) may be performed using a kernel having a size of 3×3 and a stride of 2.

At operation 250 shown in FIG. 2A, a display device (e.g., display 22 shown in FIG. 6) communicatively coupled to the computing device may display a stylized image based on at least the performed plurality of upscaling operations and the reference image. The method 100 may generate video (e.g., as shown in image 320 of FIG. 3C) in the artistic style of the reference image (e.g., as shown in image 310 of FIG. 3B). Stabilization methods for optical flow estimation may be used in implementations of the disclosed subject matter to reduce noise of the generated video.

Figure 4A:
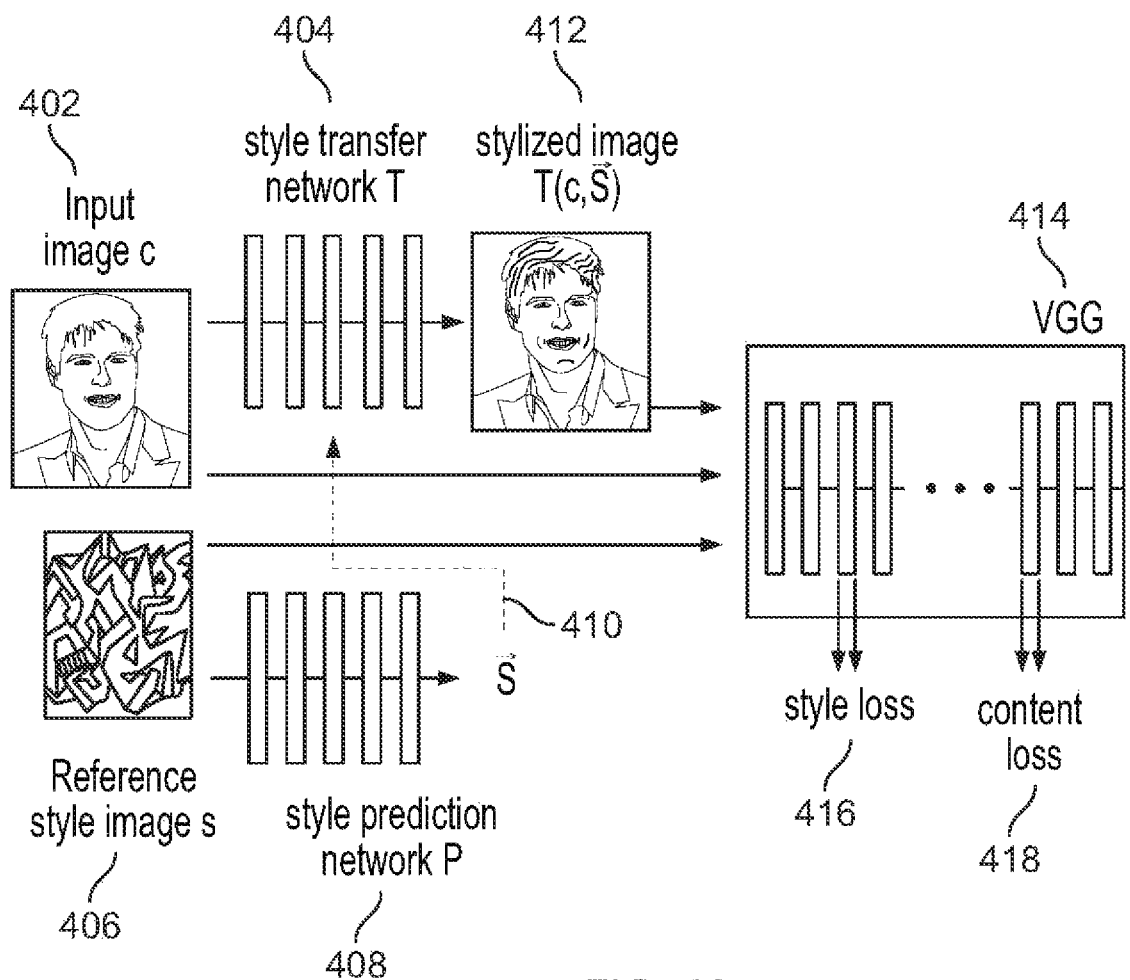
FIG. 4A shows a style transfer model that uses three neural networks according to an implementation of the disclosed subject matter.

Implementations of the disclosed subject matter may provide a style transfer model 400 shown in FIG. 4A, which uses three neural networks. Although three neural networks are described throughout, there may one or more neural networks used. The first neural network may be a style prediction network that receives a reference image as an input, and outputs a data representation of it. The second neural network may be a transformer network that takes an input image (i.e., the image to be transformed) along with the data representation and outputs a stylized image. The third neural network may be a loss network which uses the reference image, the input image, and the stylized image to determine the content and style similarity amongst the three images. In some implementations, the loss network may use less than three or more than three images to determine similarity amongst the images.

For example, FIG. 4A shows an input image c (402) applied to a style transfer network T (404) and a reference image s (406) applied to a style prediction network P (408). The output (410) of the style prediction network P (408) may be applied to the style transfer network T (404) to generate the stylized image T (412). The input image c (402), the reference image s (406), and the stylized image T (412) may be inputs to a loss network (414) (e.g., Visual Geometry Group (VGG-16) convolutional neural network). The loss network (414) may determine a style loss (316) and/or a content loss (318) based on the input image c (402), the reference images (406), and the stylized image T (412).

Figure 4B:
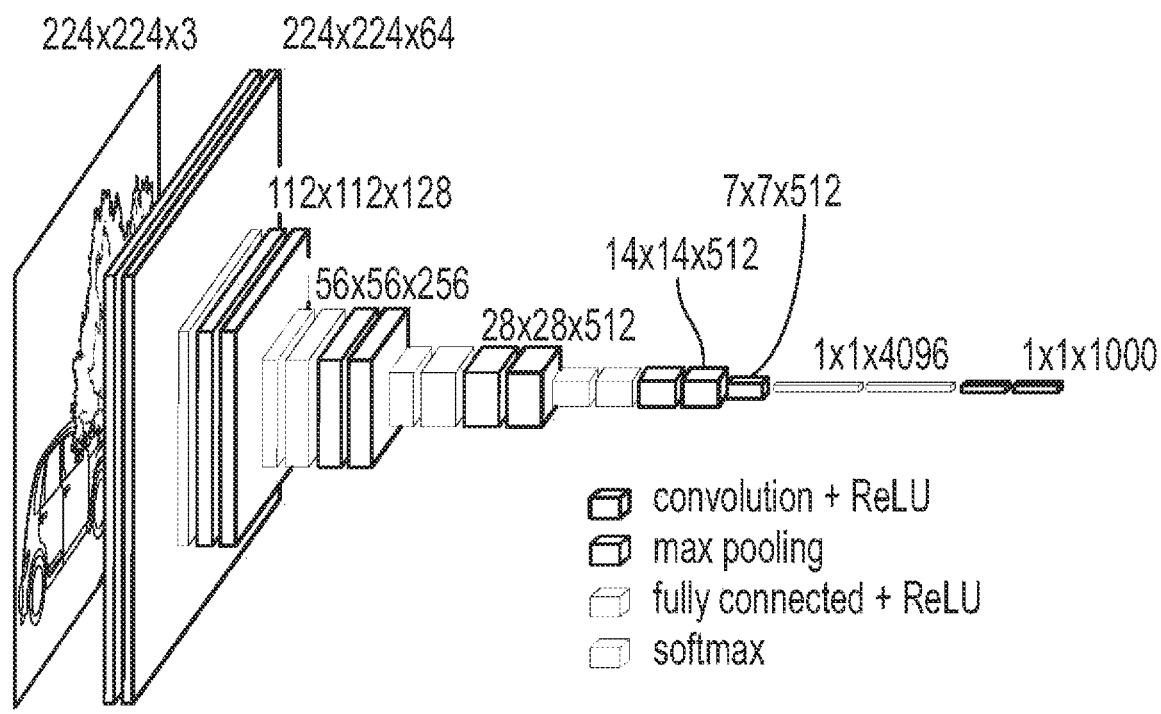
FIG. 4B shows a loss network architecture of the style transfer model of FIG. 4A according to an implementation of the disclosed subject matter.

The loss network (e.g., VGG loss network 314 shown in FIG. 4A) may guide the transformer network to determine a balance between image content (e.g., from the input image c (302)) and style (e.g., from the reference image s (306)), and/or the scale of the features transferred. To calculate the loss, each image (e.g., input image c (302), reference image s (306), and stylized image T (312)) may be provided to a pre-trained image classification network (e.g., VGG loss network 314). The loss network architecture (420) is shown in FIG. 4B.

For the content loss (e.g., content loss 418 as shown in FIG. 4A), the representations of the input image (e.g., input image c (402) shown in FIG. 4A) and stylized image (e.g., reference image s (406)) on each layer may be compared to determine how closely they match. The style loss (e.g., as shown in FIG. 4A) may be determined by comparing the correlations between the reference image and the stylized image.

In each successive set of layers, the loss network (414) may aggregate information over a predetermined area, going from a low-level local representation of predetermined small patterns to defining features and/or characteristics of the image as a whole.

The final loss may be a weighted sum across one or more components of the content loss and style loss. The weighting may be adjusted in the example shown in FIGS. 5A-5M and described below, and the weighting may show what each layer contributes in the context of an example video game frame stylization. In this example, the labels (e.g., conv1, conv2, conv3, and/or conv4) may correspond to the first layer in each set of convolution layers in FIGS. 1A-1B. That is, the higher the convolution number, the higher-level the representation.

Figure 5A:
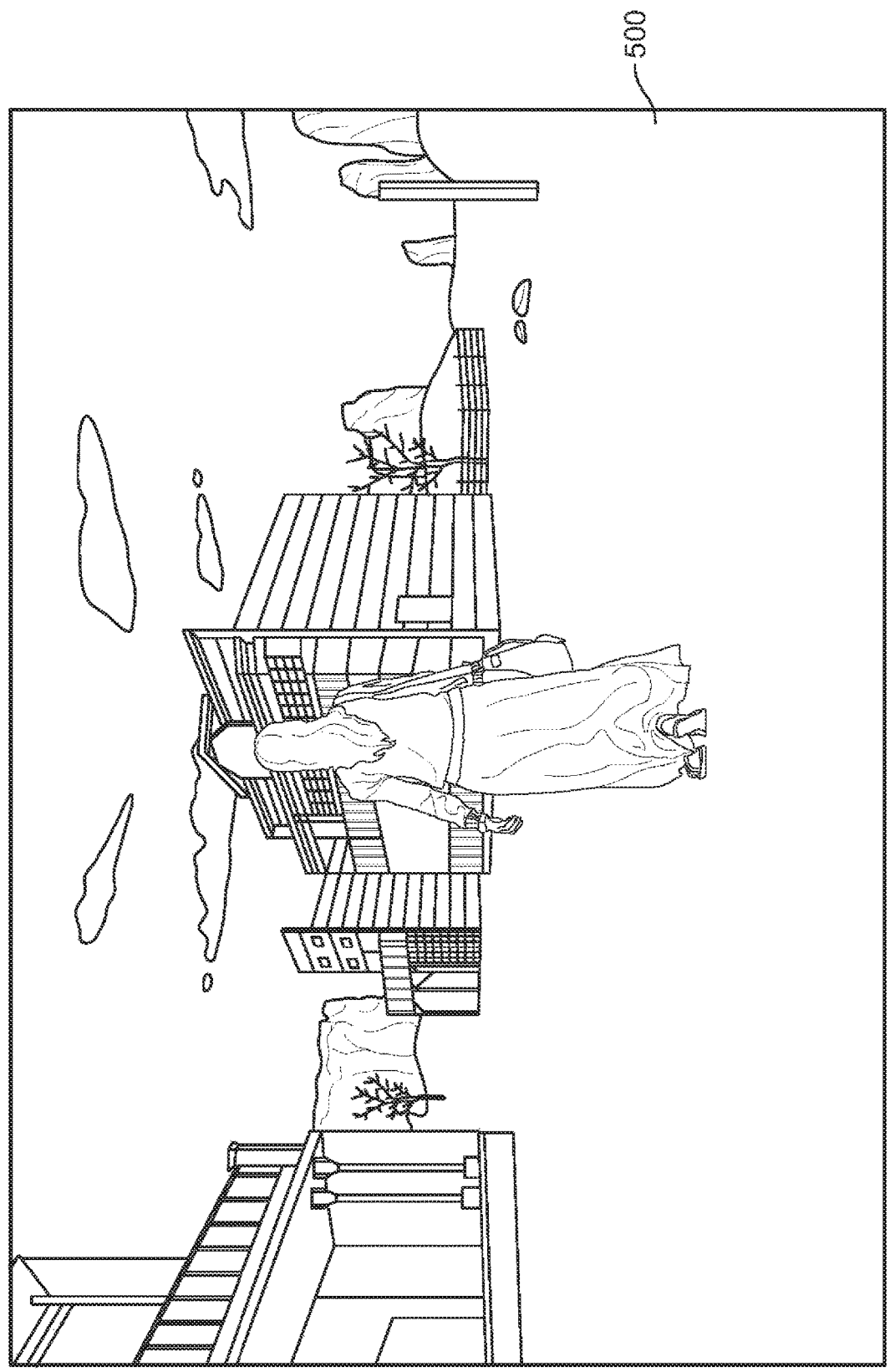
FIGS. 5A-5M show images of an example of weighted adjustments in a style transfer according to an implementation of the disclosed subject matter.
Figure 5B:
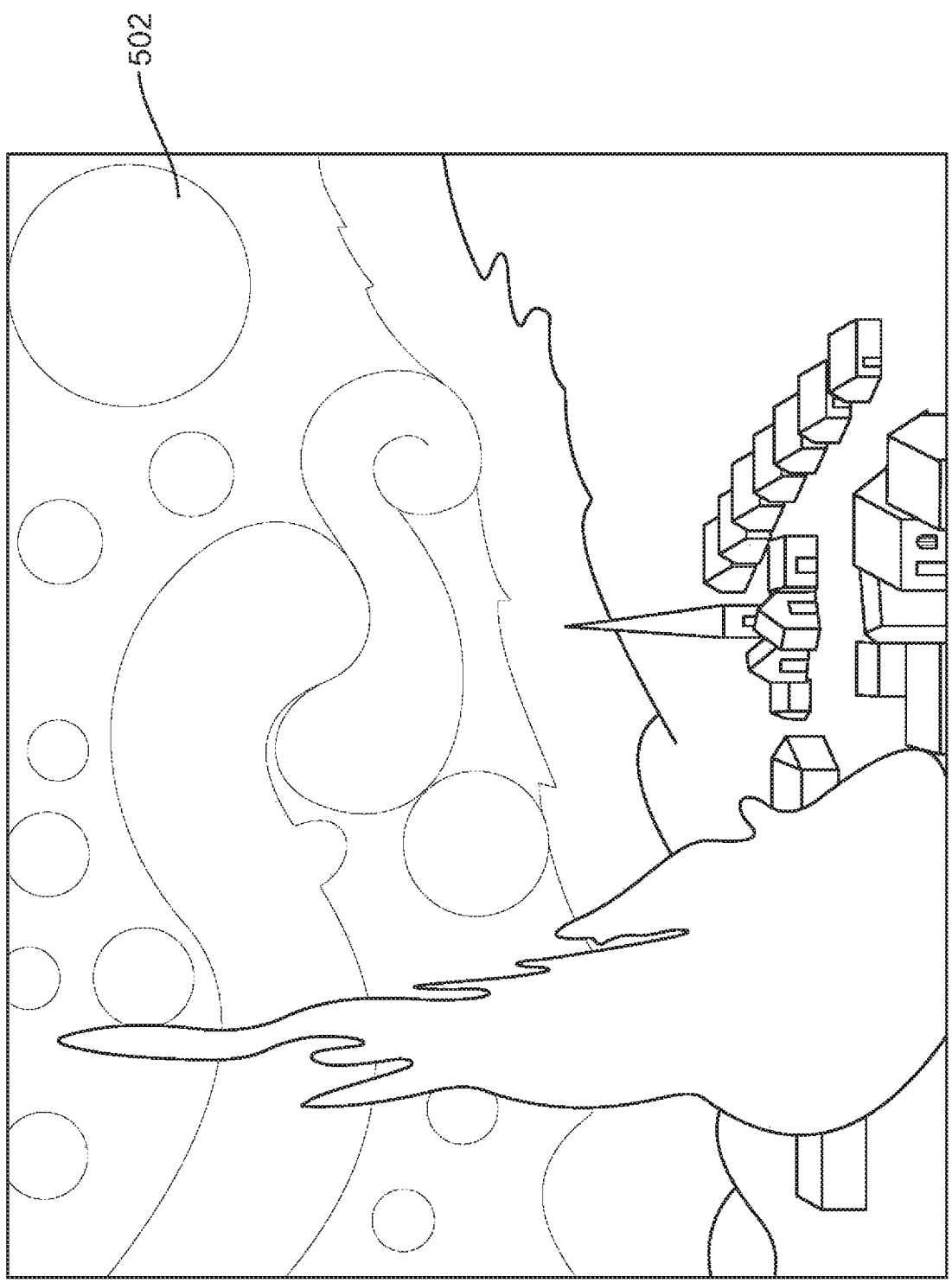

FIG. 5A shows the input image 500 that the above-described neural networks were trained on, which has a balance of a busy sky features, plain ground features, and detailed buildings. FIG. 5B shows the reference image 502 for the example.

In this example, the base settings before adjustments for the images are the following:
Input_image_size=800
Reference_style_image_size=800
Input_image_weights: {'vgg_16/conv3': 1}
Reference_image_style_weights: {'vgg_16/conv1': $1e^{-3}$, 'vgg_16/conv2': $1e^{-3}$, 'vgg_16/conv3': $1e^{-3}$, 'vgg_16/conv4': $1e^{-3}$}
total_variation_weight=$1e^{63}$.

Figure 5C:
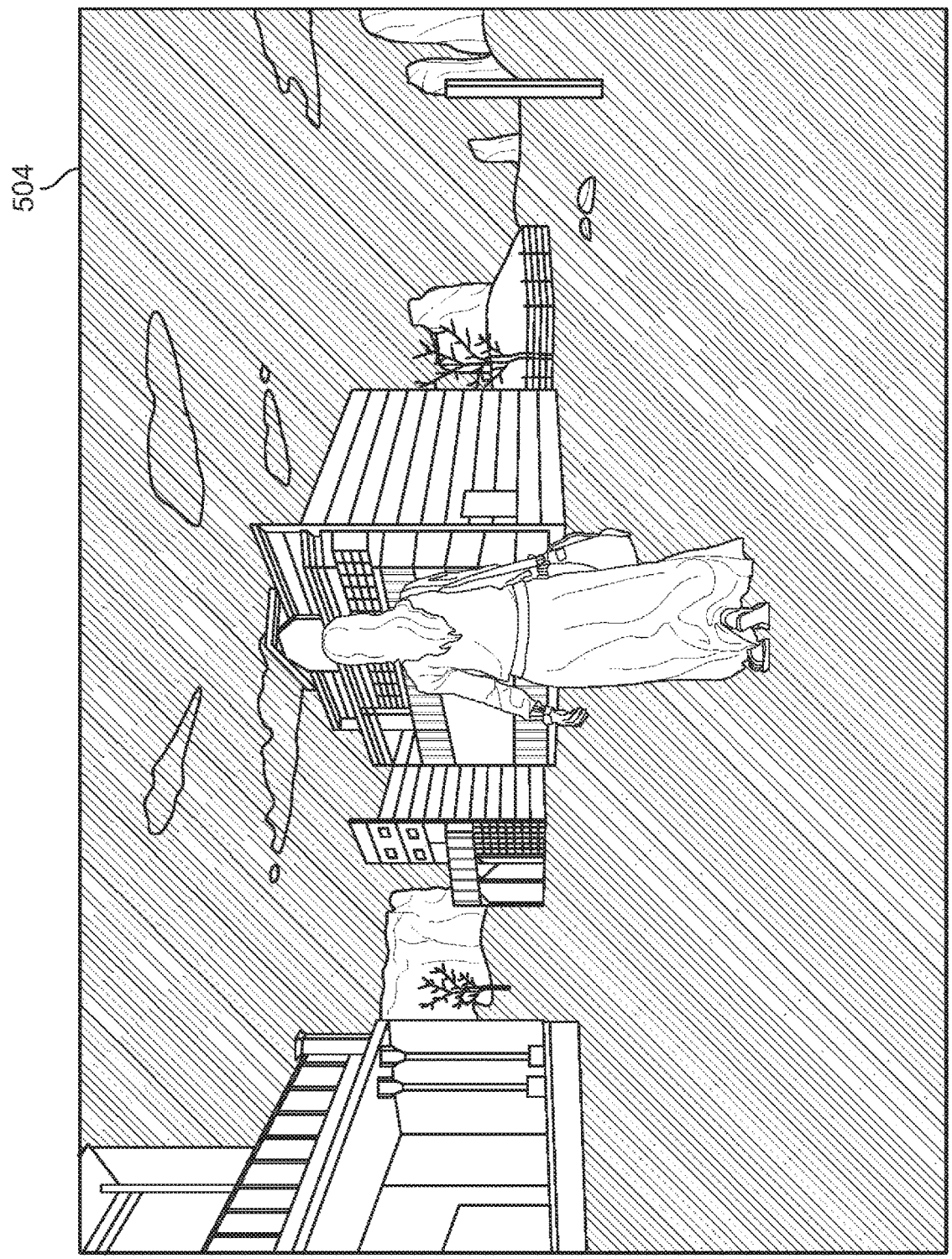

FIG. 5C shows the image 504, which may be the input image 500 trained with the above parameters.

Figure 5D:
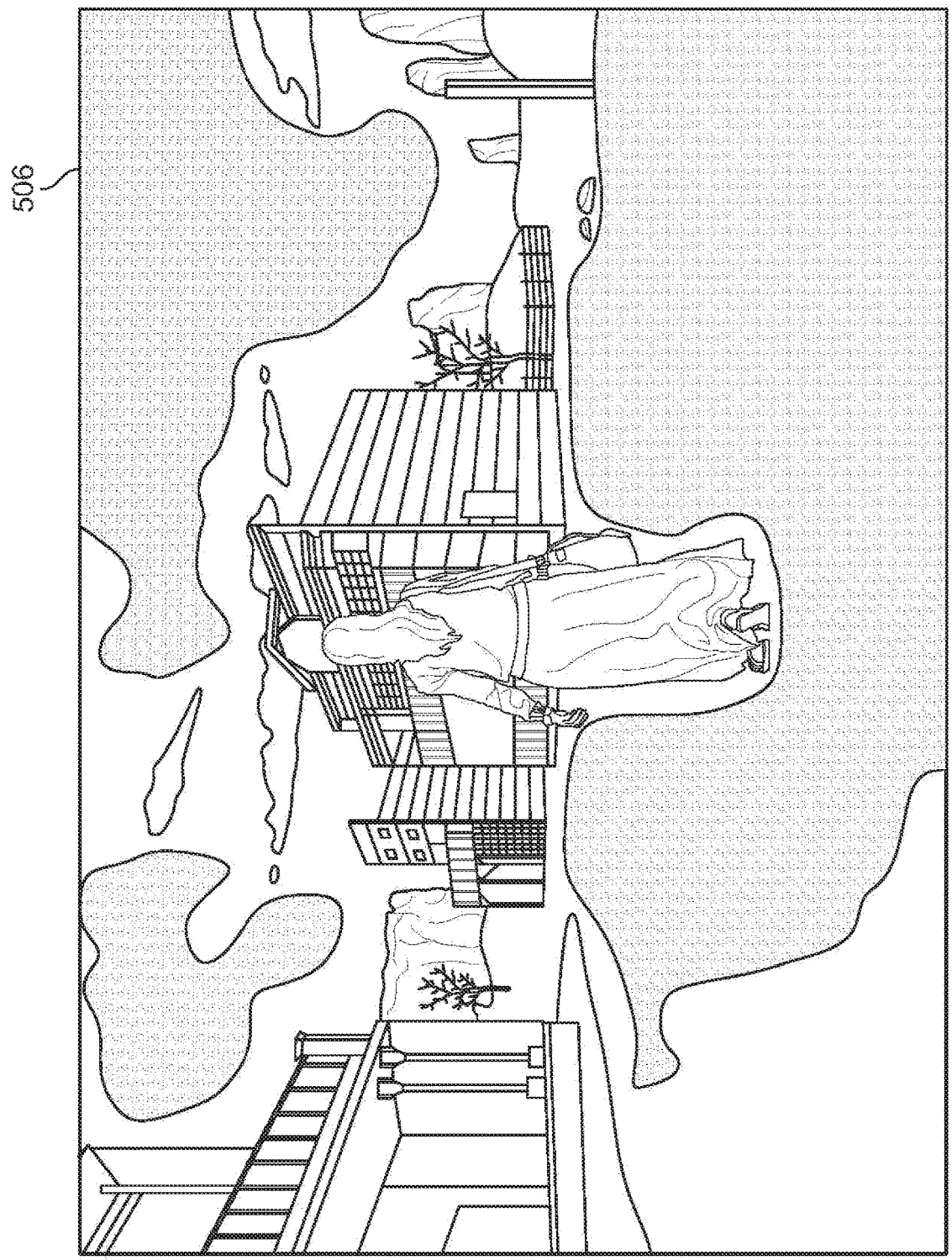
Figure 5E:
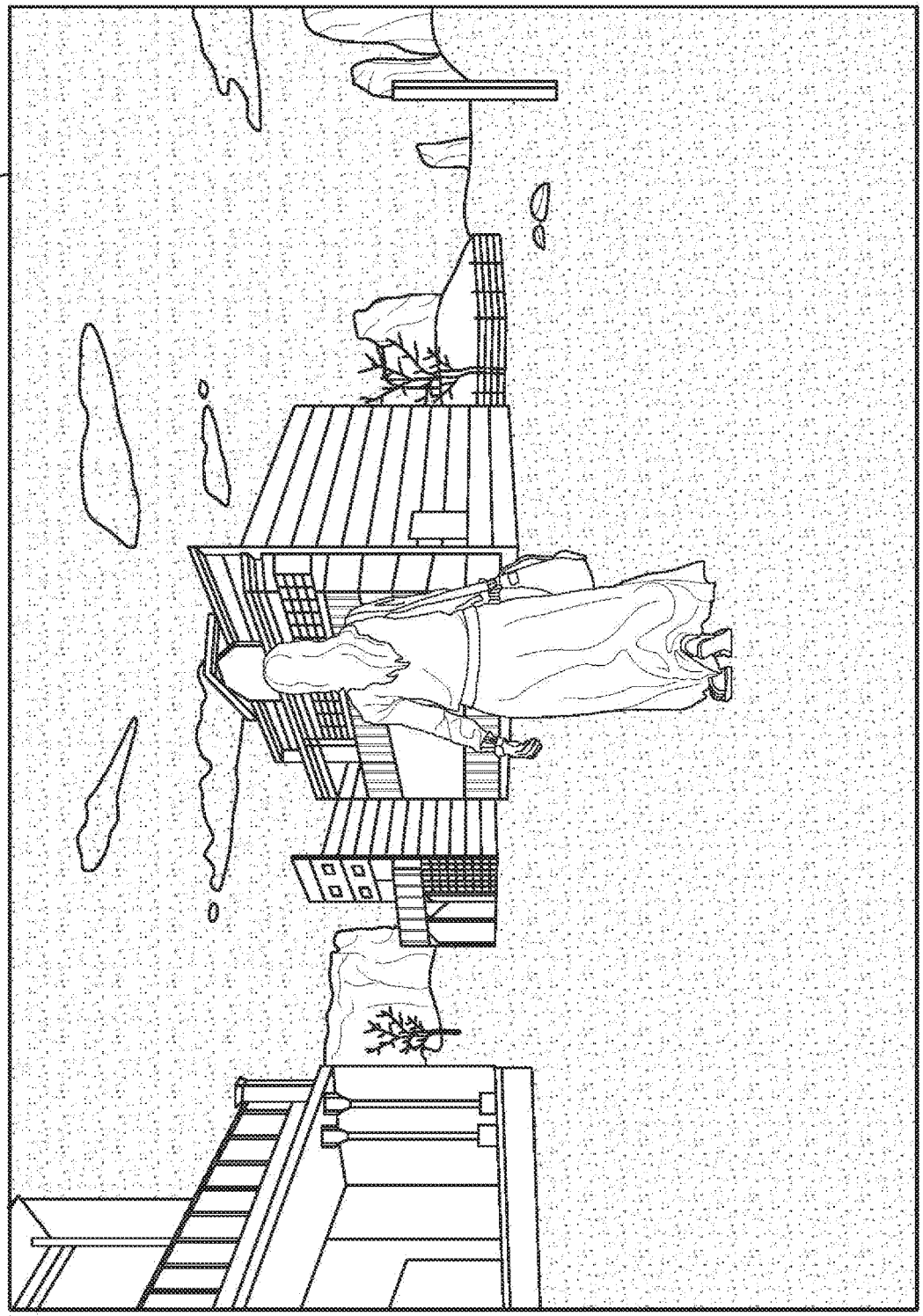
Figure 5F:
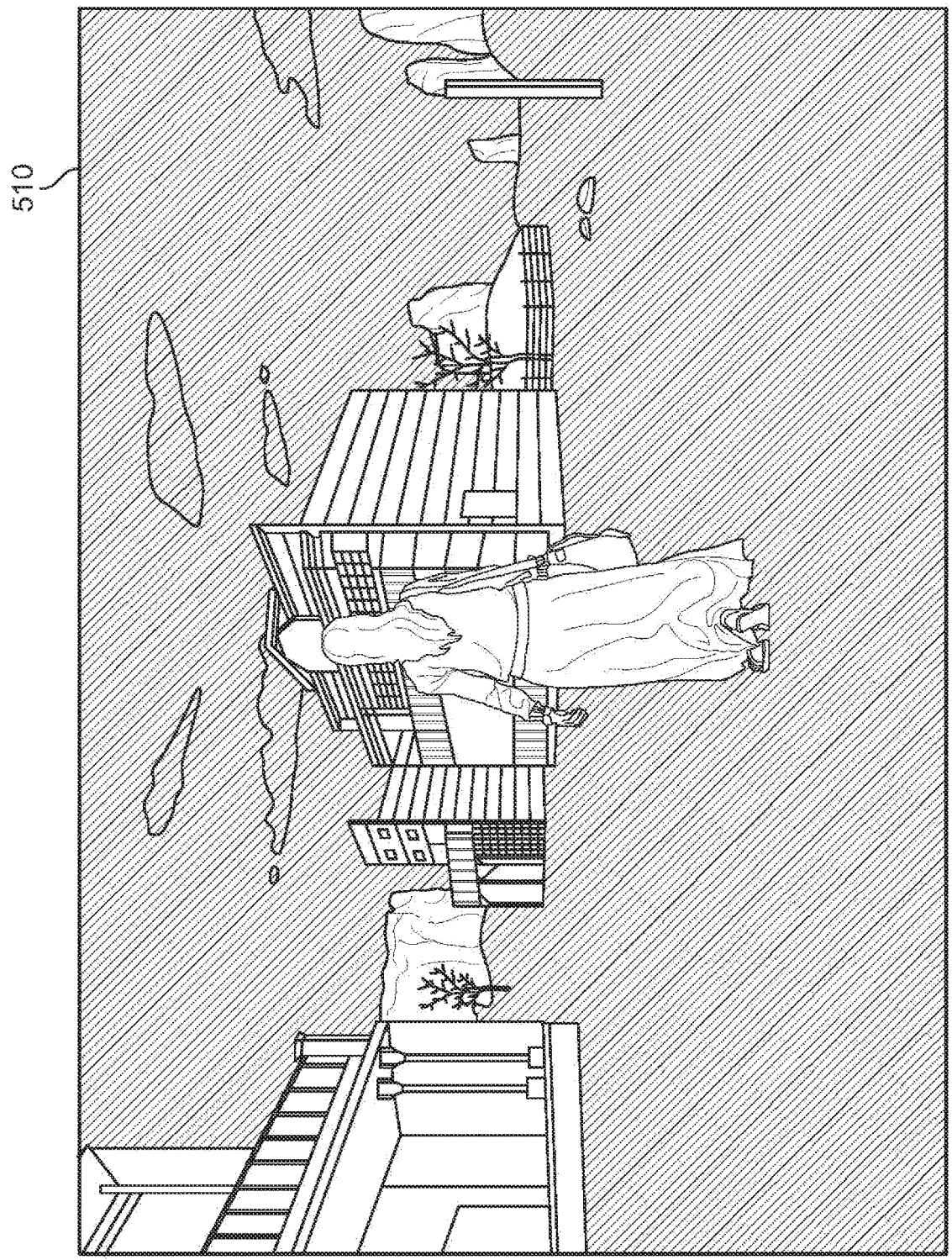
Figure 5G:
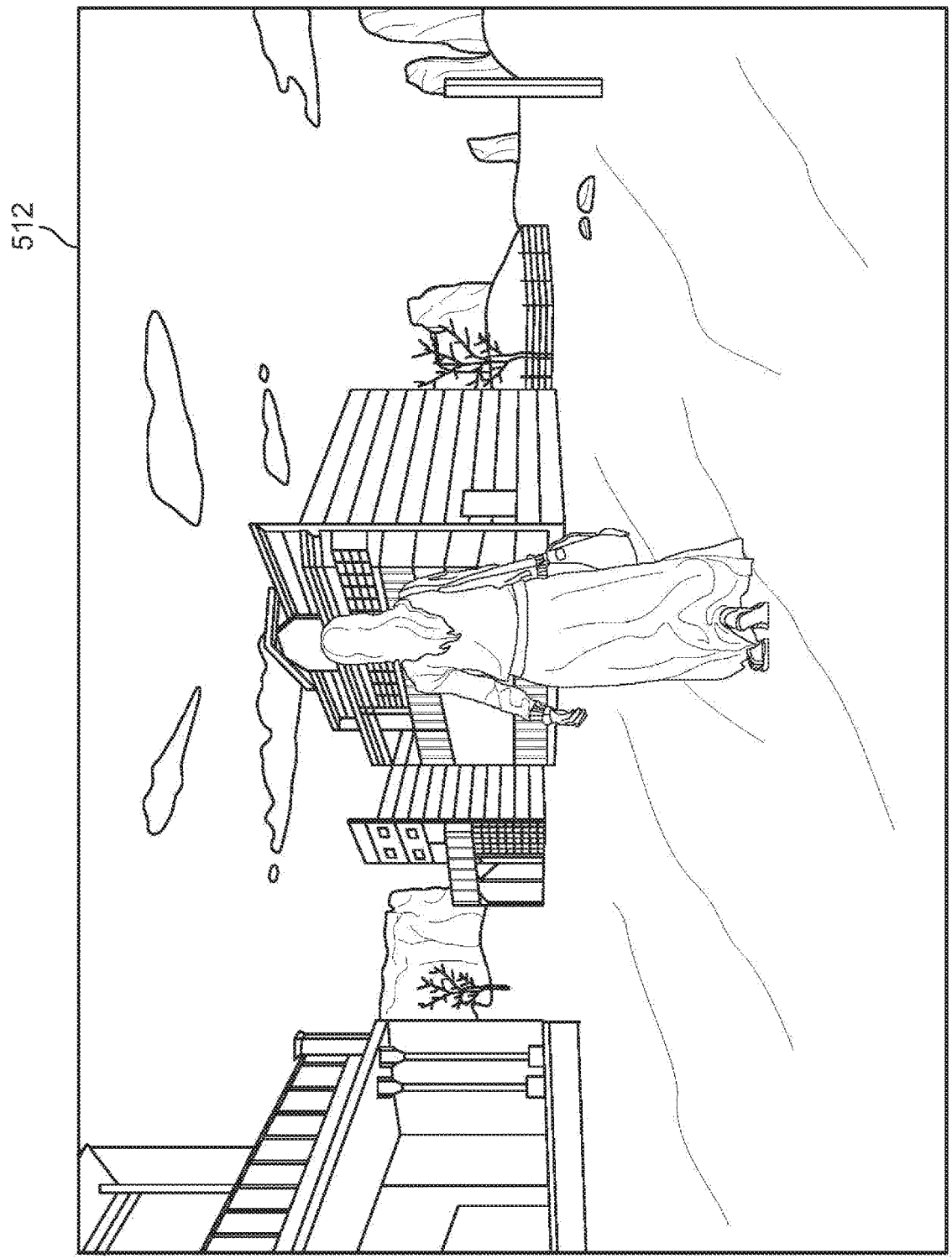
Figure 5H:
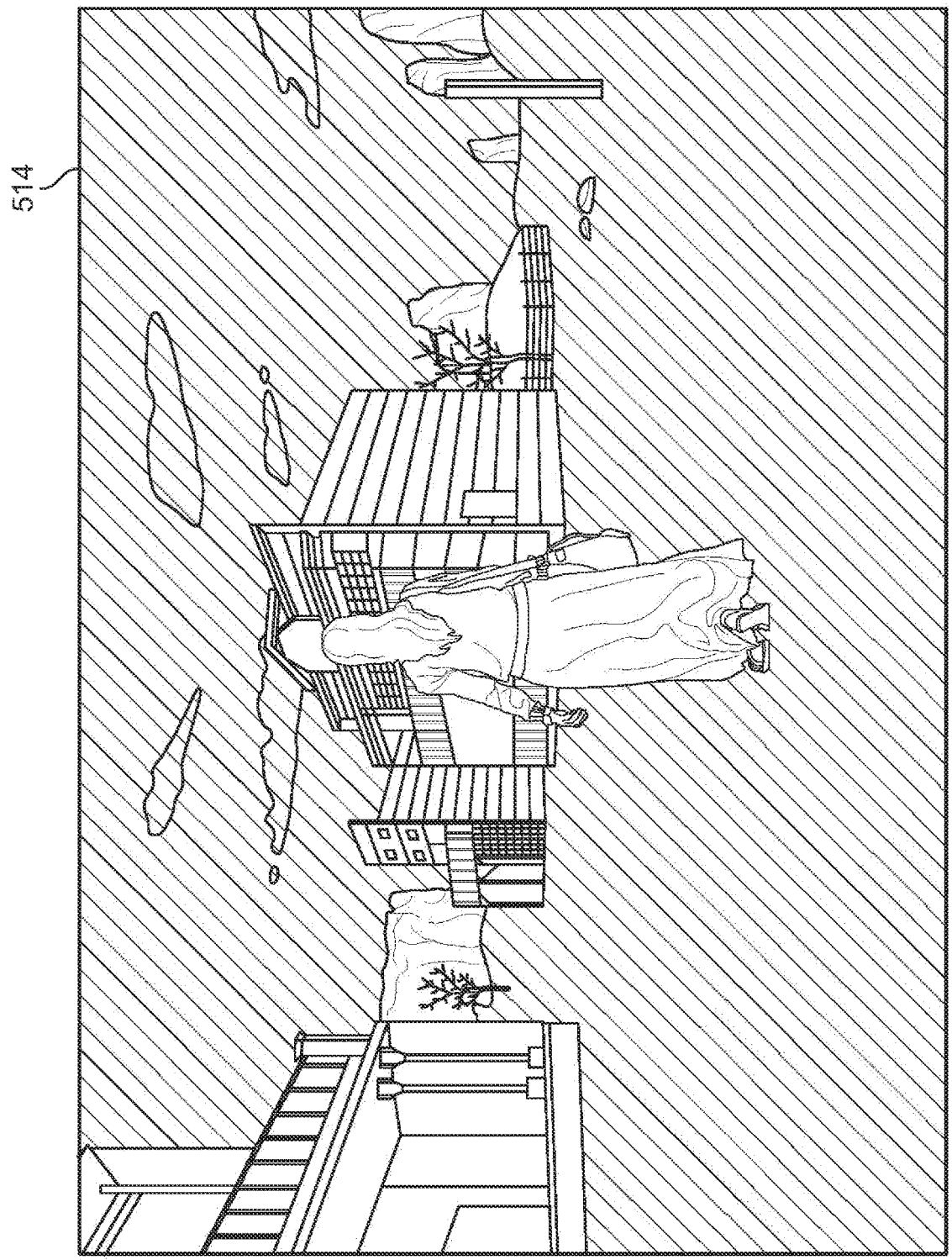

In this example, FIGS. 5D-5H may be trained with style losses from respective layers of conv1 (FIG. 5D), conv2 (FIG. 5E), conv3 (FIG. 5F), and conv4 (FIG. 5G). FIG. 5H may include all of these layers (i.e., the combination of conv1, conv2, conv3, and conv4 layers). In FIGS. 5D-5H, the weight may be changed from $1e^{-3}$ to $1e^{-2}$, and the content parameters may be unchanged from the default parameters shown above.

The image 506 shown in FIG. 5D (conv1) may include gradients, with the less detailed parts of the image filled in by a repeating pattern artifact. Image 508 shown in FIG. 5E (conv2) may include diagonal and/or horizontal artifacts, and may include mid-range-sized feature of the moon in the reference image (shown in FIG. 5B). Image 510 shown in FIG. 5F (conv3) may include the distinctive brushstrokes of the reference image (image 502 of FIG. 5B), and may not appear to have pixel pattern artifacts. In image 512 shown in FIG. 5G (conv4), since the relative values of the conv4 loss are comparatively low, the model reconstructs the input image (e.g., image 500 shown in FIG. 5A) when trained on it. Image 514 shown in FIG. 5H includes the model as trained on essentially the same parameters as the default, but with all the style weights multiplied by 10. The image 514 in FIG. 5H may have bolder style patterns in areas that are not as detailed in the input image 500 in FIG. 5A. In this combined image (image 514 of FIG. ZH) and conv3 (image 510 of FIG. 5F), there are some stars from the reference image 502 shown in FIG. 5B.

Figure 5I:
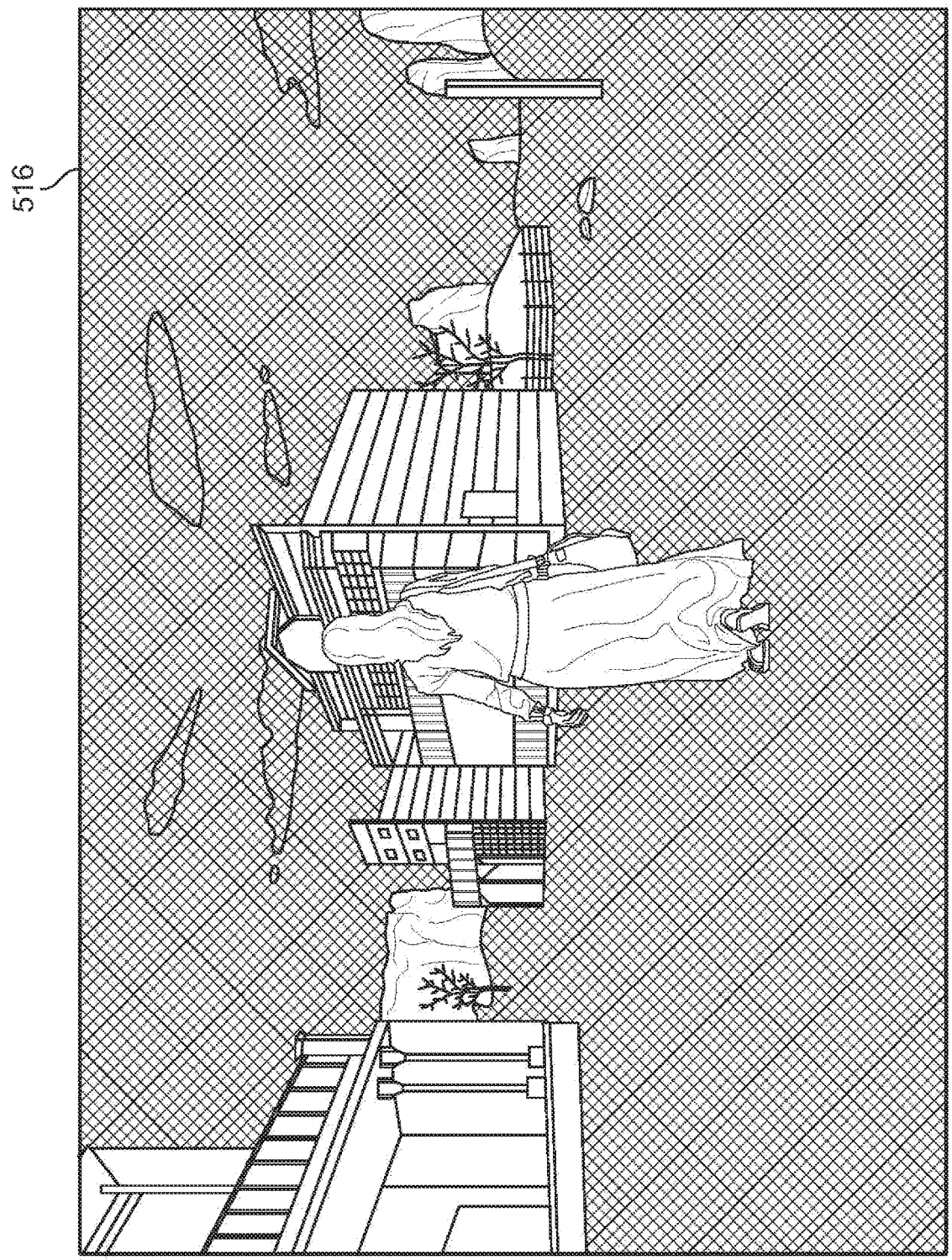
Figure 5J:
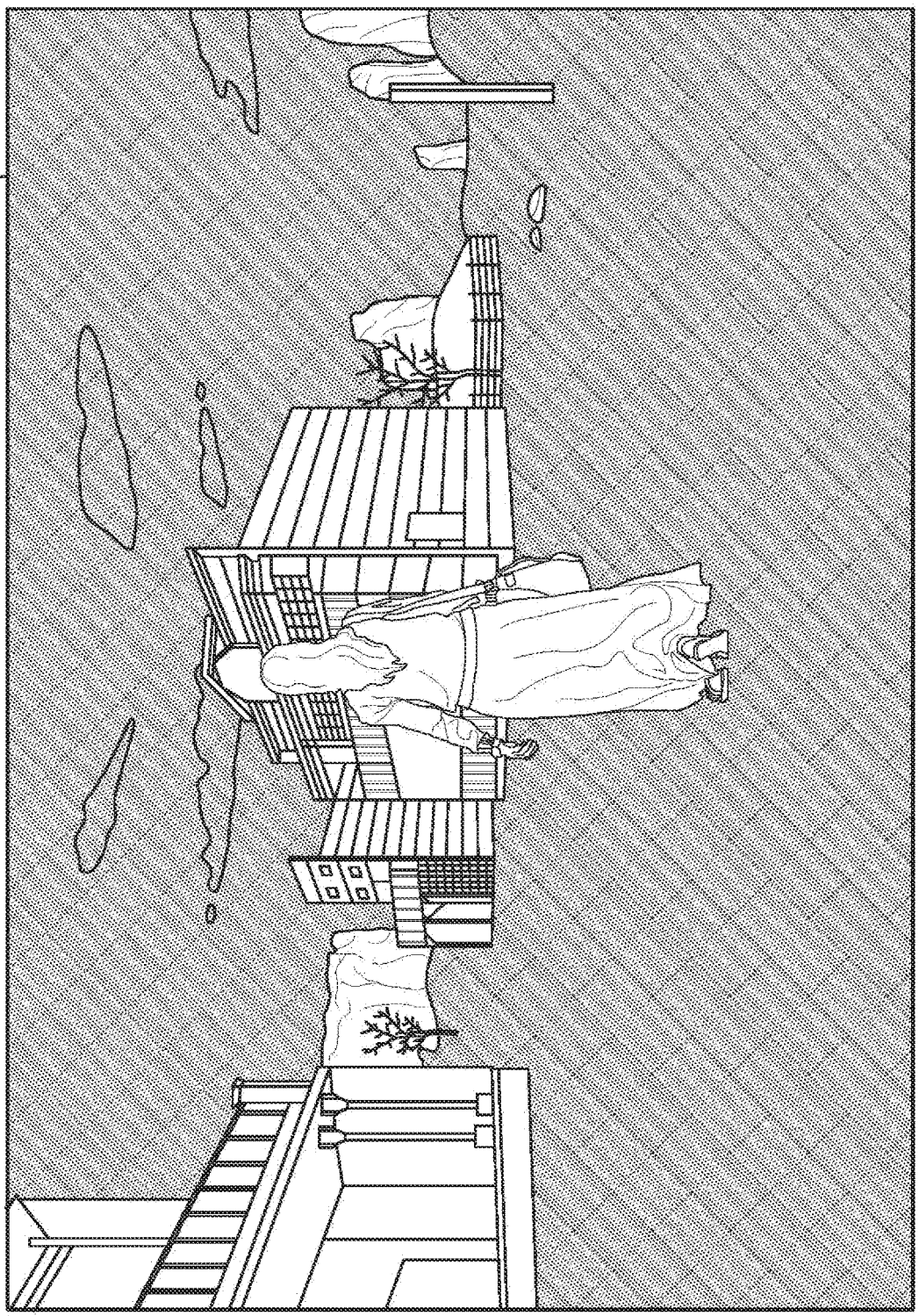
Figure 5K:
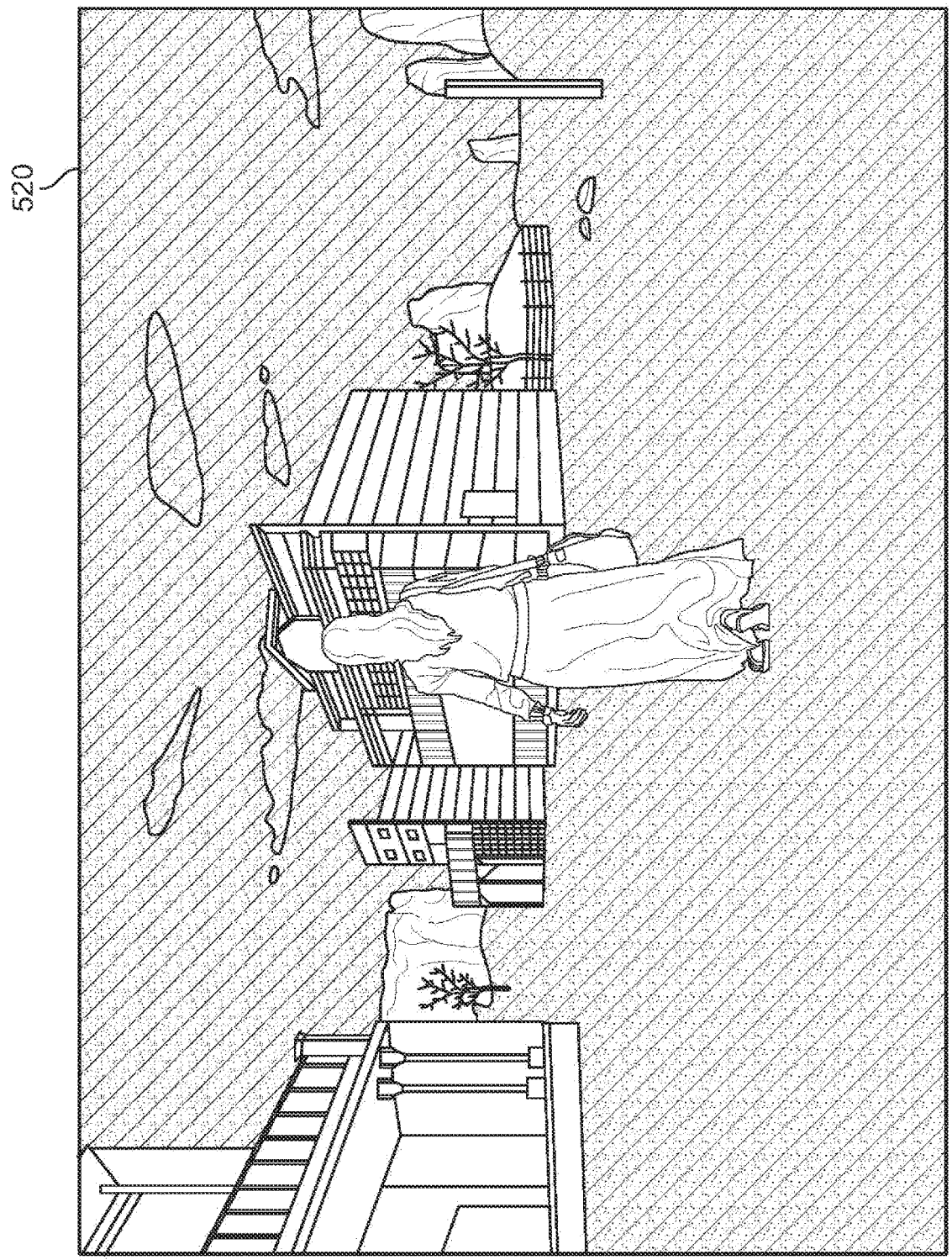
Figure 5L:
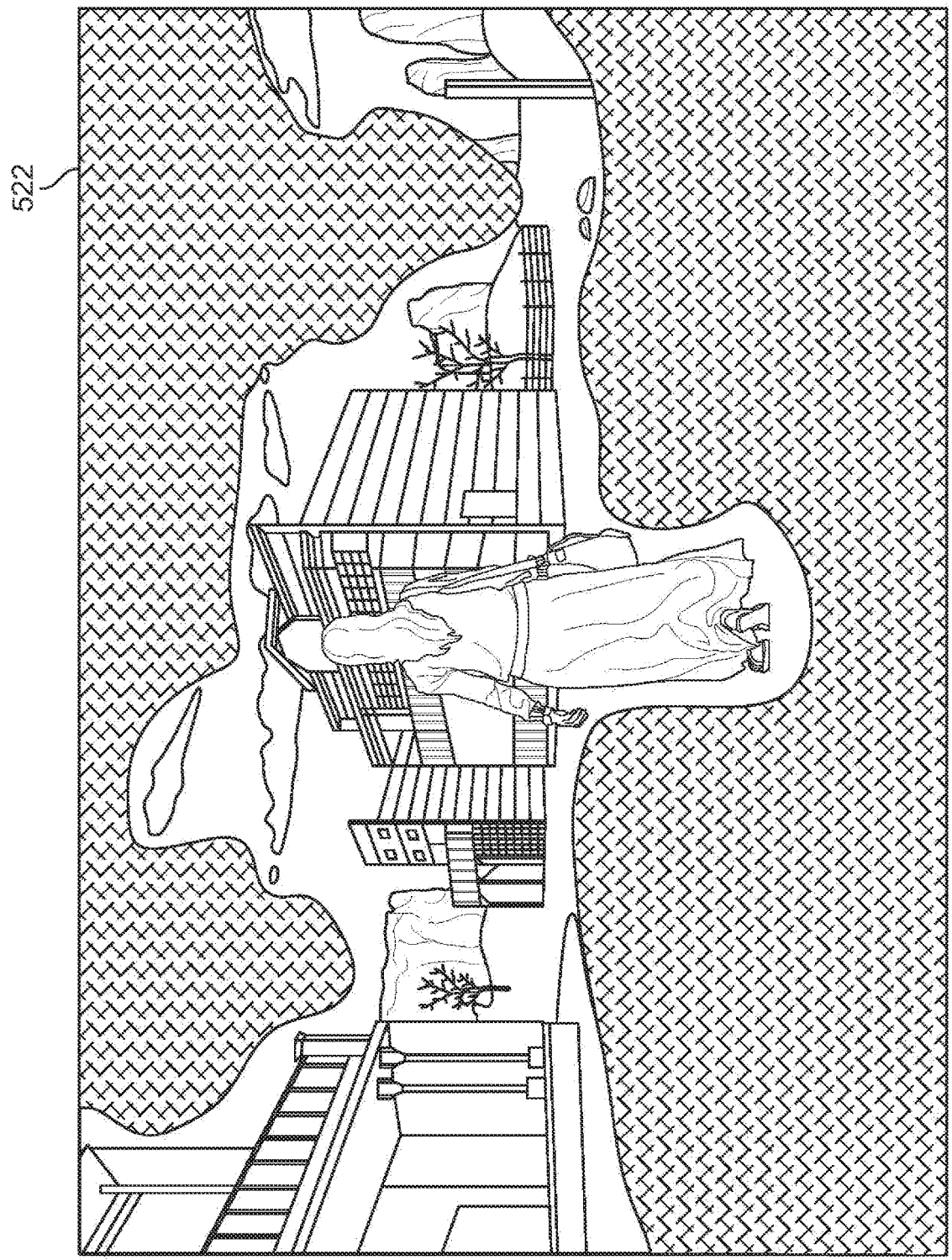
Figure 5M:
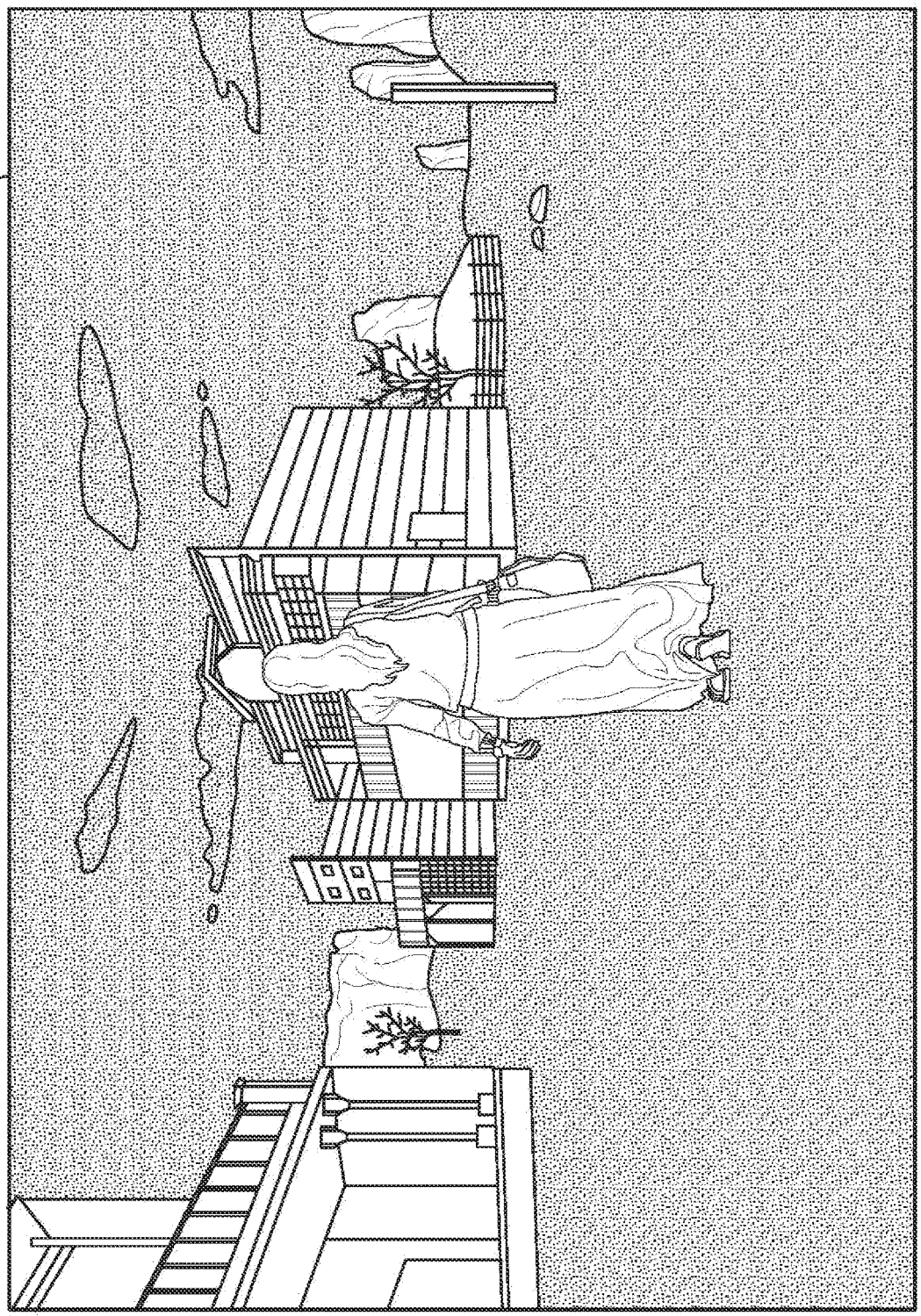

FIGS. 5I-5M show images that were trained with content losses from conv1 (image 516 of FIG. 5I), conv2 (image 518 of FIG. 5J), conv3 (image 520 of FIG. 5K), and conv4 (image 522 of FIG. 5L). FIG. 5M shows an image 524 that includes all of these layers (i.e., the combination of conv1, conv2, conv3, and conv4 layers). The style parameters may be unchanged from the default (i.e., the base settings described above), and the input image weight may be 1 for all convolutions except conv4 (image 522 of FIG. 5L), which may be set to $1e^2$ due to its low relative values.

The conv1 image (image 516) of FIG. 5I may appear similar to the style conv3 image (image 520 of FIG. 5F), and the conv2 image (image 518) of FIG. 5J may appear to have a ground portion that is relatively clean. The conv3 image (image 520) of FIG. 5K may be visually similar to the conv2 version (image 518 of FIG. 5K), though with slightly stronger brushstrokes and much messier ground. The conv4 image (image 522) of FIG. 5L may retain the details of the actual objects, and may have sacrificed content for style in sections that did not affect the main details of the image. The image 524 of FIG. 5M may include the conv1, conv2, conv3, and conv4 images may have a milder style transfer. This may be because the overall content loss is weighted higher.

In the above example, the stylization of the image 510 shown FIG. 5F and image 516 shown in FIG. 5I appear to bring out the brushstrokes of the reference image 502 shown in FIG. 5B. The stylization of the image 510 shown in FIG. 5F "flows" more like the reference image 502 shown in FIG. 5B, while the image 516 shown FIG. 5I may look like the input image 500 shown in FIG. 5A, but matches the brushstrokes of the reference image 502 shown in FIG. FIG. 5B more, especially in the sky. The style loss from the lower levels (e.g., the conv1 (image 506 shown in FIG. 5D, the conv2 image shown as image 508 in FIG. 5E) may add the extra texture to the brushstrokes in the conv3 image (image 510 shown in FIG. 5F) that may be present in the stylizations of the combined image (image 514) shown in FIG. 5H and the conv1 image (image 516) shown in FIG. 5I.

In the example above shown in FIGS. 5A-5M, the loss weights were not adjusted so that they would be scaled relative to each other. That is, the losses were such that conv2>conv3>conv1, and these losses were greater than conv4. However, most of convolutions shown in FIGS. 5D-5G and 5I-5L may be different enough so that the images appear to have qualitative difference in results.

Based on the results of the above-describe example, the model may be trained with different combinations of the different layer losses, and/or with different ratios between the input image and reference image sizes to see how the textures come out. In some implementations, the more the settings are adjusted so that the style of the reference image is more prevalent in the resultant image, the more flicker the image may have in motion sequences of, for example, a video game. In some implementations, the model may be trained with along with one or more stabilization methods (e.g., optical flow, noise, or the like).

The convolutional neural network of the style transfer system of the disclosed subject matter may use fewer channels and convolutions than present systems, so that processors (e.g., graphical processing units (GPUs)) may efficiently processes the convolutions. Present systems may perform convolutions with, for example, both a larger 9×9 kernel and a 3×3 kernel, and may perform scaling operations to a higher number of channels. For example, some present systems may perform scaling operations from 3 to 32 channels, 32 to 64 channels, and 64 to 128 channels. Although such systems may have fewer residual blocks, each block may have a higher number of channels, which may increase the number of computations. Current systems have an increased number of downscaling and upscaling stages, compared to the implementations of the disclosure subject matter. That is, by reducing the number of channels, the number of scaling operations, and the number of convolutions, implementations of the disclosed subject matter may provide style transformation of video in real-time at high resolution (e.g., 1080p).

To enhance the stability across consecutive frames, the convolutional neural network of the disclosed subject matter may use a stabilization term in the loss function based on the predicted optical flow of the pixels. Although this may be computationally intensive, this computation may only be performed in some implementations when training the convolutional neural network, and may not be performed when generating images using video footage and a reference image. That is, once the convolutional neural network has been trained, implementations of the disclosed subject matter may perform style transfers with reduced computational complexity, as the loss function may not need to be computed. The convolutional neural network may learn to enforce stability of features, even though it performs operations on one frame at a time. The stabilization term may provide the convolutional neural network of disclosed subject matter an "awareness" of the frames that proceed and that follow a current frame. That is, the stabilization term may smooth the style transfer between consecutive frames (e.g., past frame, present frame, and next frame) so that there may not be abrupt visual changes from frame to frame.

The convolutional neural network may be trained using, for example, one or two minutes of video from an environment, such as a video game environment. In some implementations, more than 2 minutes of video (e.g., 10 minutes, 20 minutes, 30 minutes, 1 hour, or the like) may be used to train the convolutional neural network. For example, in a video game that has a plurality of different visual environments, the convolutional neural network may be trained with about 2 minutes of video for each of the different environments. The convolutional neural network that is trained with the input video generate a set of weights.

In order to apply the style transfer to any video game (e.g., without the need for access to the game's source code), implementations of the disclosed subject matter may provide the generated set of weights to postprocessing shaders. In some implementations, the set of weights may be for Vulkan™ postprocessing shaders. The weights from the trained model may be exported to and applied by the shader. In some implementations, the weights may be changed at runtime. The shader with the weights may be small (e.g., around 512 KB), and may be run in real time on top of a video stream and/or game stream. That is, the shader may be run at a high framerate (e.g., 45-60 frames per second, or more) on a video layer.

The shader may run on a video stream provided by a cloud-based gaming platform, a server based gaming platform, or any suitable computer based gaming platform that may be used to transform the video stream of the video game environment as it is run into the artistic style of the reference still image. In some implementations, the convolutional neural network may be run continuously, the shader may be stored in a different location, different rendering systems may be used, and/or the shader may be integrated into the game engine itself (rather than running on the video layer).

In implementations of the disclosed subject matter, a magnitude of a style may be customizable so as to be increased or decreased. That is, the amount of influence of the reference still image on the resulting video may be changed. The amount of noise present in the image may be changed, which may change how the convolutional neural network performs the style transformation. In some implementations, the amount of video used to train the model may be increased, and/or the amount of noise textures used to train the model may be changed.

Real-time execution of artistic style transfer as provided by implementations of the disclosed subject matter may allow for increased video game interaction, including the real-time shifting of visual styles during gameplay, individually customized artistic styles (e.g., personalization and the like), styles generated through user generated content (e.g., turn a drawing into a game), and rapid iteration on video game art style. In traditional systems, translating an illustrated two dimensional image into a fully realized game environment typically requires custom texture painting, modeling, material crafting, lighting, and tuning. Real-time artistic style transfer provided by implementations of the disclosed subject matter may allow for reduced time to move from game concept to testing an interactive game environment. Implementations of the disclosed subject matter, when applied to video games, may provide style changes based on the mood of a player's character in a game, and/or may provide different stylizing to different parts of a game world or universe.

Implementations of the disclosed subject matter may providing shifting art styles in real time, so as to provide video games with a plurality of art styles. Implementations of the disclosed subject matter may provide testing of a plurality of art styles to quickly and efficiently find suitable art styles for a particular game.

Figure 6:
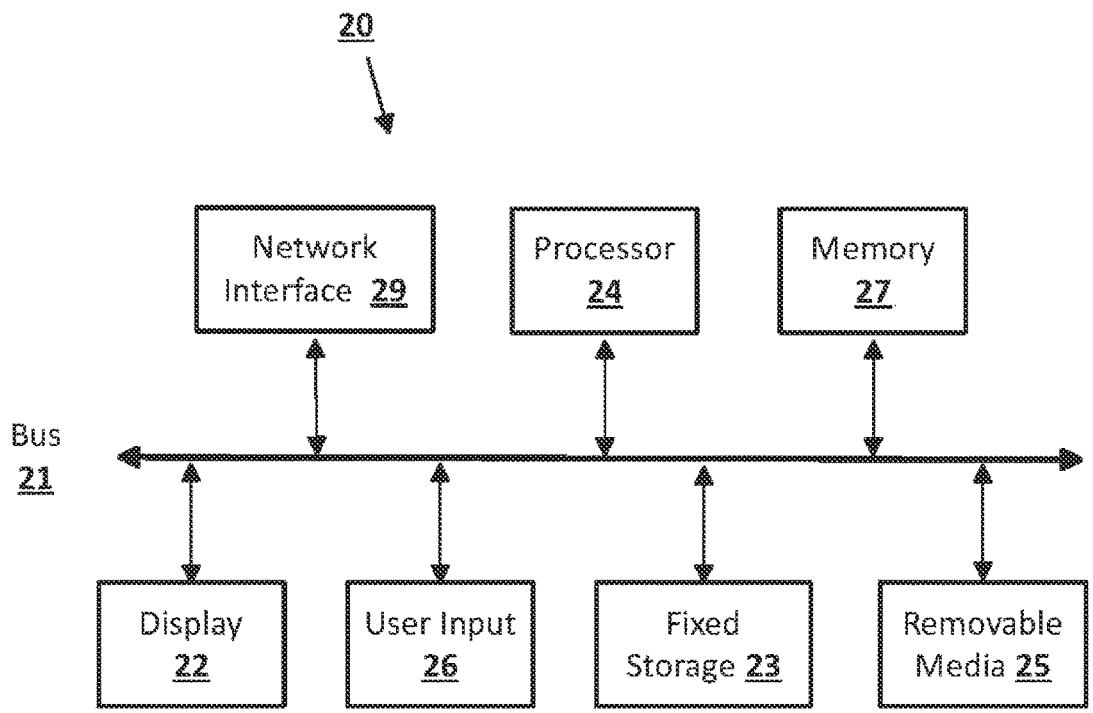
FIG. 6 shows a computing device according to an implementation of the disclosed subject matter.

Embodiments of the presently disclosed subject matter may be implemented in and used with a variety of component and network architectures. FIG. 6 is an example computing device 20 suitable for implementing embodiments of the presently disclosed subject matter. The device 20 may be, for example, a desktop or laptop computer, or a mobile computing device such as a smart phone, tablet, or the like. The device 20 may be a user device, a style transfer device, a convolutional neural network device, a shader device, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth(R), near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 7:
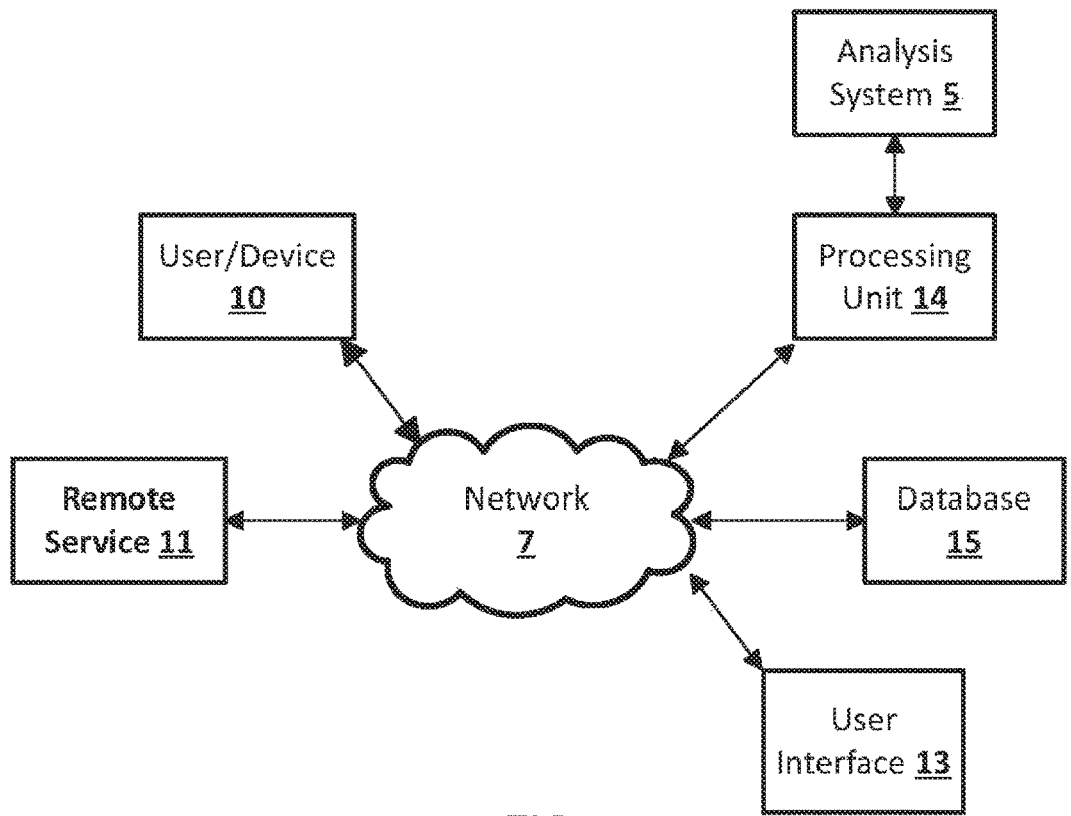
FIG. 7 shows an example network and system configuration according to an implementation of the disclosed subject matter.

FIG. 7 shows an example arrangement according to an implementation of the disclosed subject matter. One or more devices or systems 10, 11, such as remote services or service providers 11, user devices 10 such as local computers, smart phones, tablet computing devices, and the like, may connect to other devices via one or more networks 7. Service providers 11 may be a style transfer systems, a convolutional neural network systems, and/or shader systems. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13, which may include, for example, style transfer systems, a convolutional neural network systems, and/or shader systems. In some cases, the devices 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing units 14 may be part of an integral system, or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

Implementations disclosed herein may include systems, devices, arrangements, techniques, and compositions such as the following:

1. A method comprising:
    receiving, at a computing device, at least one image and a reference image;
    performing, at the computing device, a plurality of downscaling operations having separable convolutions on the received at least one image comprising:
        performing a first separable convolution with a kernel to convert a first set of channels to a second set of channels, wherein the number of the second set of channels is greater than the first set of channels; and
        performing a second separable convolution with the kernel to convert the second set of channels of the first separable convolution to a third set of channels, wherein the number of the third set of channels is greater than the second set of channels; and
    forming, at the computing device, a plurality of residual blocks, with each residual block containing two separable convolutions of the kernel and two instance normalizations;
    performing, at the computing device, a plurality of upscaling operations on the plurality of residual blocks comprising:
        performing a first upscaling operation by performing a third separable convolution on the third set of channels to convert them to the second set of channels; and
        performing a second upscaling operation by performing a fourth separable convolution on the second set of channels to convert them to the first set of channels; and
    displaying, at a display device communicatively coupled to the computing device, a stylized image based on at least the performed plurality of upscaling operations and the reference image.
2. The method of implementation 1, further comprising:
    applying, at the computing device, a filter to input values of the received at least one image, wherein the filter is based on a vector of weights and a bias before performing the first separable convolution.
3. The method of implementation 2, further comprising:
    outputting, at the computing device, at least one of the weights and the bias to a postprocessing shader.
4. The method of any previous implementation, wherein a kernel of the first separable convolution and the second separable convolution has a size of 3×3 with a stride of 2, wherein the stride is an amount the kernel is shifted.
5. The method of any previous implementation, wherein the first separable convolution comprises:
    converting, at the computing device, the first set of channels having 3 channels to the second set of channels having 32 channels.
6. The method of implementation 5, wherein the second separable convolution comprises:
    converting, at the computing device, the second set of channels having 32 channels to the third set of channels having 64 channels.
7. The method of any previous implementation, wherein the formed residual blocks include 15 residual blocks, with each residual block containing two separable convolutions of a 3×3 kernel and two instance normalizations.
8. The method of any previous implementation, wherein the first upscaling operation and the second upscaling operation are performed using a kernel having a size of 3×3 and a stride of 2, wherein the stride is an amount the kernel is shifted.
9. The method of any previous implementation, wherein the first upscaling operation comprises:
    performing, at the computing device, the third separable convolution by converting 64 channels of the third set of channels to 32 channels of the second set of channels.
10. The method of implementation 9, wherein the second upscaling operation comprises:
    performing, at the computing device, the fourth separable convolution by converting the 32 channels of the second set of channels to 3 channels of the first set of channels.
11. The method of any previous implementation, further comprising:
    adding, at the computing device, the image noise to the received at least one image.
12. A system comprising:
    a computing device including at least a processor and a memory to:
        receive at least one image and a reference image;
        perform a plurality of downscaling operations having separable convolutions on the received at least one image comprising:
            perform a first separable convolution with a kernel to convert a first set of channels to a second set of channels, wherein the number of the second set of channels is greater than the first set of channels; and
            perform a second separable convolution with the kernel to convert the second set of channels of the first separable convolution to a third set of channels, wherein the number of the third set of channels is greater than the second set of channels; and
        form a plurality of residual blocks, with each residual block containing two separable convolutions of the kernel and two instance normalizations;

perform a plurality of upscaling operations on the plurality of residual blocks comprising:
  perform a first upscaling operation by performing a third separable convolution on the third set of channels to convert them to the second set of channels; and
  perform a second upscaling operation by performing a fourth separable convolution on the second set of channels to convert them to the first set of channels; and
a display device, communicatively coupled to the computing device, to display a stylized image based on at least the performed plurality of upscaling operations and the reference image.

13. The system of implementation 12, wherein the computing device applies a filter to input values of the received at least one image, wherein the filter is based on a vector of weights and a bias before performing the first separable convolution.

14. The system of implementation 13, wherein the computing device outputs at least one of the weight and the bias to a postproceesing shader.

15. The system of any previous implementation, wherein a kernel of the first separable convolution and the second separable convolution has a size of 3×3 with a stride of 2, wherein the stride is an amount the kernel is shifted.

16. The system of any previous implementation, wherein the computing device converts the first set of channels having 3 channels to the second set of channels having 32 channels for the first separable convolution.

17. The system of implementation 16, wherein the computing device converts the second set of channels having 32 channels to the third set of channels having 64 channels for the second separable convolution.

18. The system of any previous implementation, wherein the formed residual blocks include 15 residual blocks, with each residual block containing two separable convolutions of a 3×3 kernel and two instance normalizations.

19. The system of any previous implementation, wherein the first upscaling operation and the second upscaling operation are performed by the computing device using a kernel having a size of 3×3 and a stride of 2, wherein the stride is an amount the kernel is shifted.

20. The system of any previous implementation, wherein the computing device performs the third separable convolution by converting 64 channels of the third set of channels to 32 channels of the second set of channels for the first upscaling operation.

21. The system of implementation 20, wherein the computing device performs the fourth separable convolution by converting the 32 channels of the second set of channels to 3 channels of the first set of channels the second upscaling operation.

22. The system of any previous implementation, wherein the computing device adds image noise to the received at least one image.

23. A means for stylizing an image comprising:
  means for receiving at least one image and a reference image;
  means for performing a plurality of downscaling operations having separable convolutions on the received at least one image comprising:
    means for performing a first separable convolution with a kernel to convert a first set of channels to a second set of channels, wherein the number of the second set of channels is greater than the first set of channels; and
    means for performing a second separable convolution with the kernel to convert the second set of channels of the first separable convolution to a third set of channels, wherein the number of the third set of channels is greater than the second set of channels; and
  means for forming a plurality of residual blocks, with each residual block containing two separable convolutions of the kernel and two instance normalizations;
  means for performing a plurality of upscaling operations on the plurality of residual blocks comprising:
    means for performing a first upscaling operation by performing a third separable convolution on the third set of channels to convert them to the second set of channels; and
    means for performing a second upscaling operation by performing a fourth separable convolution on the second set of channels to convert them to the first set of channels; and
  means for displaying a stylized image based on at least the performed plurality of upscaling operations and the reference image.

24. The means of implementation 21, further comprising:
  means for applying a filter to input values of the received at least one image, wherein the filter is based on a vector of weights and a bias before performing the first separable convolution.

25. The means of implementation 24, further comprising:
  means for outputting at least one of the weights and the bias to a postprocessing shader.

26. The means of any previous implementation, wherein a kernel of the first separable convolution and the second separable convolution has a size of 3×3 with a stride of 2, wherein the stride is an amount the kernel is shifted.

27. The means of any previous implementation, wherein the means for performing the first separable convolution comprises:
  means for converting the first set of channels having 3 channels to the second set of channels having 32 channels.

28. The means of implementation 27, wherein the means for performing the second separable convolution comprises:
  means for converting the second set of channels having 32 channels to the third set of channels having 64 channels.

29. The means of any previous implementation, wherein the formed residual blocks include 15 residual blocks, with each residual block containing two separable convolutions of a 3×3 kernel and two instance normalizations.

30. The means of any previous implementation, wherein the first upscaling operation and the second upscaling operation are performed using a kernel having a size of 3×3 and a stride of 2, wherein the stride is an amount the kernel is shifted.

31. The means of any previous implementation, wherein the means for performing the first upscaling operation comprises:
  means for performing the third separable convolution by converting 64 channels of the third set of channels to 32 channels of the second set of channels.

32. The means of implementation 31, wherein the second upscaling operation comprises:
means for performing the fourth separable convolution by converting the 32 channels of the second set of channels to 3 channels of the first set of channels.

33. The means of any previous implementation, further comprising:
means for adding the image noise to the received at least one image.

The invention claimed is:

1. A method comprising:
receiving, at a computing device, at least one image and a reference image;
performing, at the computing device, a plurality of downscaling operations having separable convolutions on the received at least one image comprising:
performing a first separable convolution with a kernel to convert a first set of channels to a second set of channels, wherein the number of the second set of channels is greater than the first set of channels; and
performing a second separable convolution with the kernel to convert the second set channels of the first separable convolution to a third set of channels, wherein the number of the third set of channels is greater than the second set of channels;
forming, at the computing device, a plurality of residual blocks, with each residual block containing two separable convolutions of the kernel and two instance normalizations;
performing, at the computing device, a plurality of upscaling operations on the plurality of residual blocks comprising:
performing a first upscaling operation by performing a third separable convolution on the third set of channels to convert them to the second set of channels; and
performing a second upscaling operation by performing a fourth separable convolution on the second set of channels to convert them to the first set of channels; and
providing, for display at a display device, a stylized image based on at least the performed plurality of upscaling operations and the reference image.

2. The method of claim 1, further comprising:
applying, at the computing device, a filter to input values of the received at least one image, wherein the filter is based on a vector of weights and a bias before performing the first separable convolution.

3. The method of claim 2, further comprising:
outputting, at the computing device, at least one of the weights and the bias to a postprocessing shader.

4. The method of claim 1, wherein a kernel of the first separable convolution and the second separable convolution has a size of 3×3 with a stride of 2, wherein the stride is an amount the kernel is shifted.

5. The method of claim 1, wherein the first separable convolution comprises:
converting, at the computing device, the first set of channels having 3 channels to the second set of channels having 32 channels.

6. The method of claim 5, wherein the second separable convolution comprises:
converting, at the computing device, the second set of channels having 32 channels to the third set of channels having 64 channels.

7. The method of claim 1, wherein the formed residual blocks include 15 residual blocks, with each residual block containing two separable convolutions of a 3×3 kernel and two instance normalizations.

8. The method of claim 1, wherein the first upscaling operation and the second upscaling operation are performed using a kernel having a size of 3×3 and a stride of 2, wherein the stride is an amount the kernel is shifted.

9. The method of claim 1, wherein the first upscaling operation comprises:
performing, at the computing device, the third separable convolution by converting 64 channels of the third set of channels to 32 channels of the second set of channels.

10. The method of claim 9, wherein the second upscaling operation comprises:
performing, at the computing device, the fourth separable convolution by converting the 32 channels of the second set of channels to 3 channels of the first set of channels.

11. The method of claim 1, further comprising:
adding, at the computing device, image noise to the received at least one image.

12. A system comprising:
a computing device including at least a processor and a memory to:
receive at least one image and a reference image;
perform a plurality of downscaling operations having separable convolutions on the received at least one image comprising:
perform a first separable convolution with a kernel to convert a first set of channels to a second set of channels, wherein the number of the second set of channels is greater than the first set of channels; and
perform a second separable convolution with the kernel to convert the second set channels of the first separable convolution to a third set of channels, wherein the number of the third set of channels is greater than the second set of channels;
subsequent to the plurality of downscaling operations, form a plurality of residual blocks, with each residual block containing two separable convolutions of the kernel and two instance normalizations;
perform a plurality of upscaling operations on the plurality of residual blocks comprising:
perform a first upscaling operation by performing a third separable convolution on the third set of channels to convert them to the second set of channels; and
perform a second upscaling operation by performing a fourth separable convolution on the second set of channels to convert them to the first set of channels; and
provide, for display at a display device, a stylized image based on at least the performed plurality of upscaling operations and the reference image.

13. The system of claim 12, wherein the computing device applies a filter to input values of the received at least one image, wherein the filter is based on a vector of weights and a bias before performing the first separable convolution.

14. The system of claim 13, wherein the computing device outputs at least one of the weights and the bias to a postprocessing shader.

15. The system of claim 12, wherein a kernel of the first separable convolution and the second separable convolution has a size of 3×3 with a stride of 2, wherein the stride is an amount the kernel is shifted.

16. The system of claim 12, wherein the computing device converts the first set of channels having 3 channels to the second set of channels having 32 channels for the first separable convolution.

17. The system of claim 16, wherein the computing device converts the second set of channels having 32 channels to the third set of channels having 64 channels for the second separable convolution.

18. The system of claim 12, wherein the formed residual blocks include 15 residual blocks, with each residual block containing two separable convolutions of a 3×3 kernel and two instance normalizations.

19. The system of claim 12, wherein the first upscaling operation and the second upscaling operation are performed by the computing device using a kernel having a size of 3×3 and a stride of 2, wherein the stride is an amount the kernel is shifted.

20. The system of claim 12, wherein the computing device performs the third separable convolution by converting 64 channels of the third set of channels to 32 channels of the second set of channels for the first upscaling operation.

21. The system of claim 20, wherein the computing device performs the fourth separable convolution by converting the 32 channels of the second set of channels to 3 channels of the first set of channels the second upscaling operation.

22. The system of claim 12, wherein the computing device adds image noise to the received at least one image.

23. A computer-readable storage medium having instructions stored thereon that, when executed by a processor, cause the processor to perform the method according to claim 1.

* * * * *